US012061992B2

(12) United States Patent
Kanner et al.

(10) Patent No.: US 12,061,992 B2
(45) Date of Patent: Aug. 13, 2024

(54) COMPUTER-IMPLEMENTED, USER-CONTROLLED METHOD OF AUTOMATICALLY ORGANIZING, STORING, AND SHARING PERSONAL INFORMATION

(71) Applicant: Zingly Technologies, Inc., Santa Monica, CA (US)

(72) Inventors: Adam Kanner, Los Angeles, CA (US); Carl Trudel, West Hills, CA (US)

(73) Assignee: Zingly Technologies, Inc., Santa Monica, CA (US)

( * ) Notice: Subject to any disclaimer, the term of this patent is extended or adjusted under 35 U.S.C. 154(b) by 0 days.

(21) Appl. No.: 18/365,305

(22) Filed: Aug. 4, 2023

(65) Prior Publication Data
US 2023/0385655 A1    Nov. 30, 2023

Related U.S. Application Data

(63) Continuation of application No. 17/975,087, filed on Oct. 27, 2022, now Pat. No. 11,720,803, which is a
(Continued)

(51) Int. Cl.
*G06F 3/048* (2013.01)
*G06F 16/54* (2019.01)
(Continued)

(52) U.S. Cl.
CPC .............. *G06N 5/02* (2013.01); *G06F 16/54* (2019.01); *G06F 16/93* (2019.01); *G06F 3/04817* (2013.01); *G06F 3/0482* (2013.01)

(58) Field of Classification Search
CPC ........... G06N 5/02; G06F 16/93; G06F 16/54; G06F 3/04817; G06F 3/0482
See application file for complete search history.

(56) References Cited

U.S. PATENT DOCUMENTS

| 5,877,766 A | * | 3/1999 | Bates | ................. | G06F 3/04855 |
| | | | | | 715/854 |
| 6,430,609 B1 | * | 8/2002 | Dewhurst | ............... | G06F 30/23 |
| | | | | | 717/121 |

(Continued)

FOREIGN PATENT DOCUMENTS

WO    2016063092    4/2016

OTHER PUBLICATIONS

Dong et al., "A Platform for Personal Information Management and Integration," 12 pages, Jan. 4, 2005.
(Continued)

*Primary Examiner* — Nicholas Augustine
(74) *Attorney, Agent, or Firm* — Sunstein LLP

(57) ABSTRACT

A computer-implemented infrastructure providing a consistent graphical user interface that supports user-controlled organizing, storing, accessing and sharing of heterogeneous personal information of a specific user uses computer processes executed by a server system. The computer processes include receiving a set of items of information from a computing device operated on behalf of the specific user; for each item of information in the received set of items, obtaining, as a result of parsing the received set of items, new information; using the new information, and other user information stored in association with an internal account of the specific user, to produce derived information; and storing the new information and the derived information, in a storage system in communication with the server system, and associating such stored item of information with an internal account of the specific user.

10 Claims, 43 Drawing Sheets

Information Type: "US-CA Driver License"
Data Fields:
● Name: Tom Smith
● License #: L1234561
● Address: 4143 Globe Ave., Culver City, CA 90230
● DOB: 2/10/74
● Expiration: 8/31/18

Related U.S. Application Data continuation of application No. 16/669,999, filed on Oct. 31, 2019, now Pat. No. 11,494,664.

(51) Int. Cl.
*G06F 16/93* (2019.01)
*G06N 5/02* (2023.01)
*G06F 3/04817* (2022.01)
*G06F 3/0482* (2013.01)

(56) References Cited

U.S. PATENT DOCUMENTS

| | | | | |
|---|---|---|---|---|
| 6,704,721 | B1* | 3/2004 | Hellerstein | G06F 16/284 |
| | | | | 707/999.102 |
| 6,907,546 | B1* | 6/2005 | Haswell | G06F 11/3684 |
| | | | | 717/124 |
| 7,490,029 | B2* | 2/2009 | Wasynczuk | G06F 30/20 |
| | | | | 703/17 |
| 7,840,912 | B2* | 11/2010 | Elias | G06F 3/04895 |
| | | | | 715/863 |
| 7,877,705 | B2* | 1/2011 | Chambers | G06F 3/04883 |
| | | | | 715/833 |
| 7,886,229 | B2* | 2/2011 | Pachet | G06F 3/017 |
| | | | | 715/756 |
| 7,937,380 | B2* | 5/2011 | Spiegelman | G06Q 30/02 |
| | | | | 707/705 |
| 8,769,431 | B1* | 7/2014 | Prasad | G06F 3/0488 |
| | | | | 715/764 |
| 8,843,853 | B1* | 9/2014 | Smoak | H04L 67/52 |
| | | | | 715/830 |
| 2003/0084429 | A1* | 5/2003 | Schaefer | G06F 11/3688 |
| | | | | 717/125 |
| 2003/0158855 | A1* | 8/2003 | Farnham | G06Q 10/109 |
| | | | | 707/999.102 |
| 2003/0169289 | A1* | 9/2003 | Holt | G06F 8/38 |
| | | | | 715/735 |
| 2004/0003042 | A1* | 1/2004 | Horvitz | G06Q 10/109 |
| | | | | 709/204 |
| 2004/0054670 | A1* | 3/2004 | Noff | G06F 16/951 |
| 2004/0158816 | A1 | 8/2004 | Pandipati | |
| 2005/0078172 | A1* | 4/2005 | Harville | H04N 7/142 |
| | | | | 348/14.09 |
| 2005/0199716 | A1* | 9/2005 | Shafer | H04L 61/30 |
| | | | | 700/215 |
| 2009/0319181 | A1* | 12/2009 | Khosravy | G06Q 30/02 |
| | | | | 701/532 |
| 2010/0030734 | A1* | 2/2010 | Chunilal | H04L 51/214 |
| | | | | 709/205 |
| 2010/0122174 | A1* | 5/2010 | Snibbe | G06Q 20/384 |
| | | | | 715/733 |
| 2011/0145275 | A1* | 6/2011 | Stewart | G06F 16/587 |
| | | | | 707/769 |
| 2011/0154268 | A1* | 6/2011 | Trent, Jr. | G06F 3/017 |
| | | | | 715/863 |
| 2011/0164058 | A1* | 7/2011 | Lemay | G06F 3/04883 |
| | | | | 345/173 |
| 2011/0167382 | A1* | 7/2011 | van Os | G06Q 10/109 |
| | | | | 715/810 |
| 2012/0198547 | A1* | 8/2012 | Fredette | G06F 3/04817 |
| | | | | 726/19 |
| 2014/0026089 | A1* | 1/2014 | Linton | G06Q 40/06 |
| | | | | 715/765 |
| 2014/0033327 | A1 | 1/2014 | Conte | |
| 2014/0149322 | A1* | 5/2014 | LaVoie | G06N 5/02 |
| | | | | 706/46 |
| 2016/0217381 | A1* | 7/2016 | Bloomquist | G06N 5/046 |
| 2017/0213156 | A1* | 7/2017 | Hammond | G06F 8/31 |
| 2018/0188916 | A1* | 7/2018 | Lyons | G06F 16/435 |
| 2019/0102684 | A1* | 4/2019 | Beran | G05B 23/0216 |
| 2019/0171944 | A1* | 6/2019 | Lu | G06N 5/022 |
| 2019/0228101 | A1* | 7/2019 | Miranda | G06N 5/02 |
| 2019/0253431 | A1* | 8/2019 | Atanda | G06F 21/62 |
| 2020/0052921 | A1* | 2/2020 | van Rensburg | H04L 12/1818 |
| 2020/0074311 | A1* | 3/2020 | Li | G06N 3/006 |
| 2020/0110520 | A1* | 4/2020 | Barlow | G06N 20/00 |
| 2020/0151836 | A1* | 5/2020 | Lingras | G06Q 50/163 |

OTHER PUBLICATIONS

International Searching Authority/EP—International Search Report and the Written Opinion, International Application No. PCT/US2019/059174, 16 pages, Jan. 22, 2020.

Starks, Examiner Wilbert L.; Final Office Action dated Dec. 27, 2021 in U.S. Appl. No. 17/368,043 (71 pages).

Sunstein, Bruce D., Notice of Appeal and Appeal Brief filed Mar. 1, 2022 in U.S. Appl. No. 17/368,043 (59 pages).

Singh, :Aggregating Privatized Medical Data for Secure Querying Applications, Doctoral Thesis, Deakin University, 2015, pp. 1-332 (Year: 2015).

Check Point Technologies Ltd., Endpoint Security Client, R72, User Guide, 2009, pp. 1-138 (Year: 2009).

Amsaleg, "A Database Perspective on Large Scale High-Dimensional Indexing, Data Structures and Algorithms", Universite Rennes, 2014, pp. 1-178 (Year: 2014).

* cited by examiner

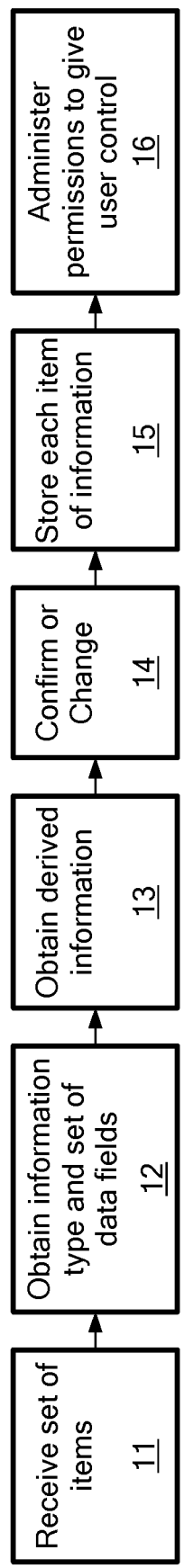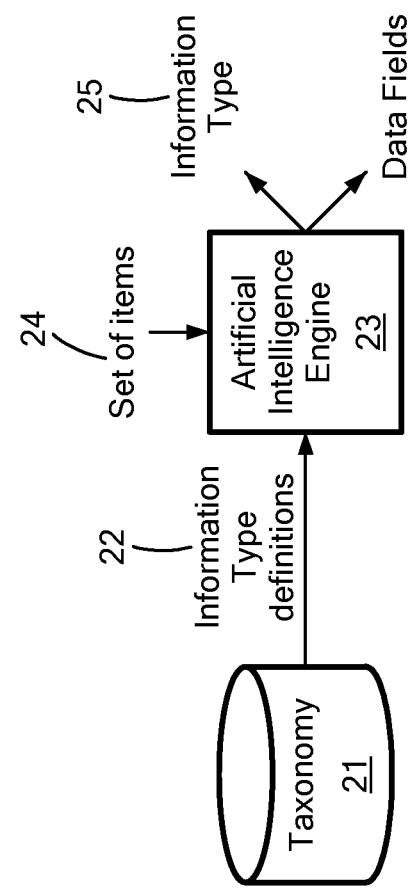

Verify Info

| | |
|---|---|
| Information Type: | Driver License |
| Name: | Tom Smith |
| License #: | I1234561 |
| Address: | 4143 Globe Ave, Culver City, CA 90230 |
| DOB: | 2/10/74 |
| Expiration: | 8/31/18 |

Edit    The info is correct — 56

*Fig. 5E*

COMPUTER-IMPLEMENTED, USER-CONTROLLED METHOD OF AUTOMATICALLY ORGANIZING, STORING, AND SHARING PERSONAL INFORMATION

PRIORITY

This application is a continuation of U.S. application Ser. No. 17/975,087, filed Oct. 27, 2022, now U.S. Pat. No. 11,720,803, which is a continuation of U.S. patent application Ser. No. 16/669,999, now U.S. Pat. No. 11,494,664, which claims the benefit of U.S. provisional patent application Ser. No. 62/755,191, filed Nov. 2, 2018. Each of these application is hereby incorporated herein by reference in its entirety.

TECHNICAL FIELD

The present invention relates to computer-implemented methods of information handling, and more particularly to computer-implemented, user-controlled method of automatically organizing, storing, and sharing personal information.

BACKGROUND ART

It is known in the prior art to provide a central storage facility for an individual to manually cause storage of personal information in a repository. See for example published US application US2014/0033327A1.

SUMMARY OF THE EMBODIMENTS

In a first embodiment of the invention there is provided a computer-implemented infrastructure providing a consistent graphical user interface supporting user-controlled organizing, storing, accessing, and sharing of heterogeneous personal information of a specific user. In this embodiment, the infrastructure uses computer processes executed by a server system, and the computer processes include:
  receiving a set of items of information from a computing device operated on behalf of the specific user, wherein receiving the set of items of information includes receiving information selected from the group consisting of (i) a digital file defining a set of images, (ii) a digital file defining a document, (iii) external account information of the specific user, (iv) textual information provided by manual input, (v) a digital file defining a video recording, (vi) a digital file defining an audio recording, (vii) digital data associated with communication across an API, and combinations thereof;
  for each item of information in the received set of items, obtaining, as a result of parsing the received set of items, new information including an information type and a set of data fields pertinent to the information type;
  feeding to an artificial intelligence engine the new information, and other user information stored in association with an internal account of the specific user, in order to produce, from the artificial intelligence engine, derived information selected from the group consisting of contact information, event information, inferred information, and relationships between the new information and the other user information; and
  storing, with respect to each item of information, the new information and the derived information, in a storage system in communication with the server system, in an encrypted format, and associating such stored item of information with an internal account of the specific user and with the corresponding information type and set of data fields;
  wherein the stored items of information are made accessible only in accordance with permissions controlled by the specific user.

In a further related embodiment, the computer processes further comprise parsing by the server system the received set of items to derive the information type and the set of data fields. Alternatively, or in addition, the information type and the set of data fields are determined by parsing by the computing device, and the computer processes further comprise receiving, by the server system, data characterizing the information type and the set of data fields. Also alternatively, or in addition, the derived information further includes a set of contextual categories pertinent to components of the new information and the derived information, wherein a contextual category is assigned to a component based on specific attributes of the component, and distinct components are permitted to be assigned distinct contextual categories that depend on attributes of the components, and each component has a set of contextual categories, and storing the new information and the derived information further includes storing each component of information with its corresponding set of contextual categories. Also alternatively, or in addition, the computer processes further include, before storing new information and derived information that are pertinent to a specific item of information, causing sharing of the new information and the derived information in accordance with a default user sharing selection. Also alternatively, or in addition, the computer processes further include, before storing new information and derived information that are pertinent to a specific item of information, generating a prompt to the specific user to make a selection concerning sharing preferences applicable thereto, storing a response of the specific user thereto, and causing sharing of such information accordingly.

In a related embodiment, the default user sharing selection for any given component of information is based on a subset of contextual categories to which the given component has been assigned. Optionally, the subset of contextual categories is selected from a global set of contextual categories and the categories in the global set are hierarchically arranged.

In a further related embodiment, upon receiving a selection from the specific user relating to a specific account asset of the user, the computer processes include causing display, on a computing device of the specific user, of a set of representations of members selected from the group consisting of contextual categories and information types pertinent to the specific account asset of the user, wherein the display includes pertinent information currently associated with the specific account regardless whether added by the specific user or by any other person or originating elsewhere and shared with the specific user.

In another related embodiment, the computer processes further include, upon receiving a selection from the specific user relating to a specific contextual category of the user, causing display, on a computing device of the specific user, of a set of representations of members selected from the group consisting of contextual categories and information types pertinent to the specific account asset of the user, wherein the display includes pertinent information currently associated with the specific account regardless whether added by the specific user or by any other person or originating elsewhere and shared with the specific user.

In another related embodiment, the artificial intelligence engine is a software component executing on the server system. Alternatively, the artificial intelligence engine is a software component executing on the computing device.

BRIEF DESCRIPTION OF THE DRAWINGS

The foregoing features of embodiments will be more readily understood by reference to the following detailed description, taken with reference to the accompanying drawings, in which:

FIG. 1 is a high-level process flow block diagram of an embodiment of the present invention.

FIG. 2 is a block diagram showing information flow, in accordance with an embodiment of the present invention, of the task 12 of FIG. 1, wherein the information type and set of data fields are obtained by parsing by an artificial intelligence engine, which is executed either on the computing device or the server system.

FIGS. 5A through 5F are a series of representations of screens experienced by a user, showing an aspect of the user interface on a user's computing device, in accordance with an embodiment of the present invention, by which a driver license is added by the user to the user's account.

DETAILED DESCRIPTION OF SPECIFIC EMBODIMENTS

Figure 3:
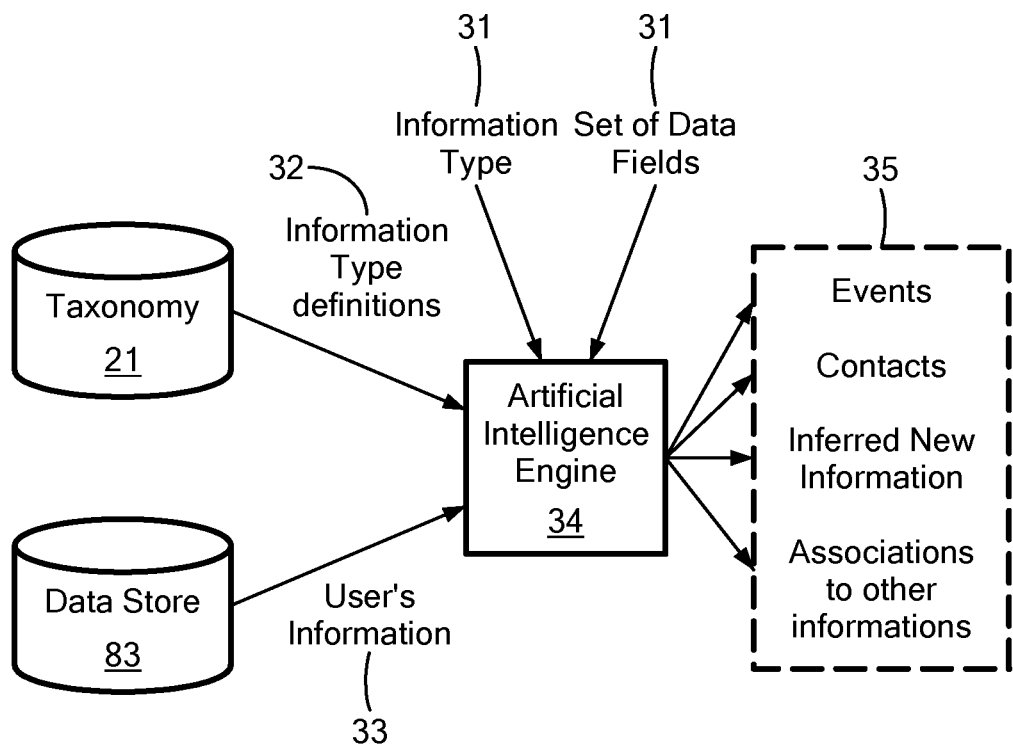
FIG. 3 is a block diagram showing information flow, in accordance with an embodiment of the present invention, of the task 13 of FIG. 1, which obtains derived information from an artificial intelligence engine.

Definitions. As used in this description and the accompanying claims, the following terms shall have the meanings indicated, unless the context otherwise requires:

A "set" has at least one member.

A "computing device" is a device in including a microprocessor and memory configured to execute instructions, such as, but not limited to, a desktop computer, a mobile telephone, a tablet computer, a laptop computer, a smart watch (such as an Apple Watch), and an intelligent home assistant (such as Alexa from Amazon).

A computing device is "operated on behalf of a user" if the device is operated by a user, or is operated by another individual who is using the computing device to communicate information that is pertinent to the user, and is to be stored as information accessible to the user via an internal account of the user.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

An "artificial intelligence engine" is a computer process, which optionally includes a process that is developed by training of a machine learning system, that performs tasks requiring inference from data contained in an item of information or derived information from the item of information.

An "item" of information is any unit of information selected from the group consisting of (i) a digital file defining a set of images, (ii) a digital file defining a document, (iii) external account information of the specific user, (iv) textual information provided by manual input; (v) a digital file defining a video recording, (vi) a digital file defining an audio recording; (vii) digital data associated with communication across an API, and combinations thereof.

An "information type" of an item of information is a broad category characterizing the item of information in a manner that defines how to classify the information and to determine what set of data fields will be relevant in describing the item of information. By way of example, information types include, a will, a blood type, a bank account, a driver's license, a pass card, a coupon, a prescription, a shopping list, an automobile registration, a deed, a lease, etc.

"Parsing" a received item of information includes extracting, from the received item of information, an information type and a set of data fields. Depending on the type of items of information, the method of extracting the information type and the data fields will vary. For instance, in embodiments of the present invention, for a set of images, optical character recognition (OCR) techniques are used to extract raw text information, which is then processed by an artificial intelligence engine to derive the information type and the data fields. As another example, embodiments of the present invention include processes of receiving items of information, in a record that includes data fields and an information type, from a manual data input; and this received information is then immediately ready to be processed by an AI engine as further described in this application.

An "internal account" of the user is an account of the user, provided in accordance with an embodiment of the present invention, associated with storing and accessing information, on a server system, with a computing device operated on behalf of the user.

"External account information" includes information associated with an account (such as a bank account, mortgage account, membership account, or subscription account), other than an internal account, to which the user has access, such information including, among other things, a number or other identifier for the account, data associated with transactions made with the account, etc.

"Inferred information" is information inferred, by an artificial intelligence engine, from new information provided as an input to the engine in the context of other user information stored in association with an internal account of the specific user. As an example, if the new information is a driver's license of the specific user, the inferred information may include the specific user's principal address.

An "event" is something that can happen at a specific date or time. An event can be a one-time only event, or a recurring event. In embodiments of the present invention, an item of information may be associated with one or more events, which can be identified on parsing of the information. Examples of events include renewal dates associated with one or more received items of information, such as dates for renewing a prescription, or a driver's license, vehicle registration, or pet registration; also expiration dates, and dates and times for reminders (such as for feeding a pet or paying estimated taxes or taking medications).

An "action" is a special type of event associated with a specific task needed to be performed by the user or by the server system at a specific date and time. Examples of actions include the following tasks: (i) confirming contact information of important contacts as defined by the user or by metadata associated with information types, (ii) specifying beneficiaries when a will or equivalent is added to the user internal account, (iii) resetting passwords when passwords are added to a user's internal account, etc. In this context, an "important contact," for example, may be a contact related to estate planning, including a beneficiary, a legal guardian, or a financial advisor, a real estate lender, etc.

A "contact" is a person or a business entity. The owner of an internal account is a contact. Any family member is a contact. Any person or business entity identified by an item of information is a contact. Information capable of being used for communicating with a contact, such as a physical address, e-mail address, telephone number, or Skype name, is "contact information."

A "contextual category" is a classification of a component of information that is obtained, in accordance with an embodiment of the present invention, after an item of information has been received by the server system, as derived information from an artificial intelligence engine that has processed the item of information. A contextual category is assigned to a component based on specific attributes of the component, and distinct components are permitted to be assigned distinct contextual categories that depend on attributes of the components, and each component has a set of contextual categories. The contextual categories are assigned in accordance with a taxonomy that provides a unifying context for similar components of information. In an embodiment of the present invention, the contextual categories are hierarchically arranged, but in a manner wherein a child category can have more than one parent category, and a parent category can have multiple child categories. For example, a driver's license may be in the contextual categories "travel documents" and "identity" and "vehicles." Similarly, the contextual category "travel documents" may include not only the driver's license but also a passport, visas, Global Entry passes, airplane tickets, etc.

An "account asset" is a contextual category that has a meaning of particular significance to a specific user on account of its role in the life of the user; an "account asset" may, but need not, have a physical existence in the world, and can be animate or inanimate, digital or temporal, and can have different information types associated with it. An "account asset" may include, for example, a particular residence, a particular vehicle, a particular item of jewelry or art (like a watch or a painting), an electronic appliance, a bank account, a life insurance contract, a year (for taxes for instance), a pet, a person, etc.

A "user interface" is a set of commands or menus through which a user interacts with a computer program. A user interface may be command-driven such that the user enters commands, menu-driven such that the user selects command choices from various menus, or a combination thereof. A user interface may be a "graphical user interface" that graphically displays to the user windows, icons, pop-up menus, etc. on a computer screen.

Modern life is increasingly complex. The days of our grandparents walking to their local bank for all their financial needs—mortgages, banking, credit, insurance—are over. Today, we work with an average of 7.2 different financial service institutions across 8.5 different products/services. Our families are increasingly non-traditional and more spread out, often requiring management of information across families, ex-spouses, aging parents, and children living across the globe. We have digital insurance cards, paperless statements and passwords to add to the already extensive list of physical documents, government IDs, healthcare information and more. The information to be managed lives within apps on our mobile phones, files on our computers, folders within file cabinets and papers on our desks.

The challenge is how to keep track of it all, to gain access to what we need, when we need it, to ensure family, friends and trusted advisors have private access to what they need and to secure it all under the user's exclusive control. The tools available today, like Dropbox, Evernote, password managers, etc., are not built to solve the problem. The solution requires new set of tools that are dynamic, namely built with intelligence, connectivity, and control, and designed to make managing life simpler, computer-implemented, and more effective.

To address such challenges, some embodiments of the present invention function as a curation engine that provides an interface layer via a distinctively structured computer environment to the vast and ever changing world of personal information. These embodiments provide a platform (server system) having a computer-implemented infrastructure, operated under user control, by which a use can provide, organize, categorize, manage, control, access, and disseminate personal information (digital and physical) within personal, private networks of family, friends, trusted advisors, etc. The personal information organized within the user-controlled infrastructure of these embodiments is comprehensive, including information related to a user's home, vehicles, healthcare, finances, etc. The infrastructure of these embodiments organizes such personal information into categories or collections (e.g., "Home and Auto"), which may be further organized into sub-categories or sub-collections (e.g., "Vehicles", "Driver's License", etc.). The infrastructure of these embodiments also secures such personal information with end-to-end encryption to prevent unauthorized access to the information. The platform of these embodiments further identifies and analyzes a user's personal information to derive related information and notify the user of events associated with the information, such as when to update a passport or renew a car registration. Features of these embodiments include computer-vision aided identification and input of physical documentation and AI-driven organization and categorization of the personal information.

The infrastructure of these embodiments enables each user to form a personal, private network of family, friends, trusted advisors, etc. by which the user can share the user's personal information. The infrastructure of these embodiments sets controls and permissions as to who in the user's personal private network has authorization to access particular items of the user's personal data, so as to secure, instant free flow of that information to the people within the user's personal network that need access to it. In some embodiments, the controls and permissions may be set for a category or sub-category in which the user's personal information is organized, or set for a particular item of personal information. An individual in the user's network may log into the platform from any electronic device (from a smartphone to a desktop computer), anywhere, and at any time to access the items of the user's personal information that the individual has authorization to access.

For example, an insurance representative may be a trusted advisor in a user's network and the user may set permissions to share with the insurance representative information organized under particular categories, including "Insurance" and "Home". The insurance representative may log into the platform at any time and access the user's personal information associated with these categories to approve an insurance policy for the user. The user may, in addition, access items of personal information shared with the user by other individuals in the user's personal network. For example, the user may access information shared by the insurance representative.

FIG. 1 is a high-level process flow block diagram of an embodiment of the present invention. The embodiment of FIG. 1 is executed by a server system that has a computer-implemented infrastructure for receiving, organizing, categorizing, securing, and sharing any personal information (physical or digital) of users. In computing process 11, the server system receives a set of items of information from a computing device operated on behalf of a specific user. The set of items of information includes information selected from the group consisting of (i) a digital file defining a set of images, (ii) a digital file defining a document, (iii) external account information of the specific user, (iv) textual information provided by manual input, (v) a digital file defining a video recording, (vi) a digital file defining an audio recording, (vii) digital data associated with communication across an API, and combinations thereof. In process 12, for each item of information in the received set of items, the server system obtains, as a result of parsing the received set of items, new information including an information type and a set of data fields pertinent to the information type. In process 13, the server system feeds to an artificial intelligence engine the new information and other user information stored in association with an internal account of the specific user, in order to produce, from the artificial intelligence engine, derived information selected from the group consisting of contact information, event information, inferred information, and relationships between the new information and the other user information. The artificial intelligence engine in this embodiment is a component of the server system. In process 14, the server system prompts the user to confirm or change the values of the new and derived information. In process 15, the server system stores, with respect to each item of information, the (confirmed or changed) new information and the derived information, in a storage system in communication with the server system, in an encrypted format, and associates such stored item of information with an internal account of the specific user and with the corresponding information type and set of data fields. In process 16, the server system administers permissions so that the stored items of information are made accessible only in accordance with permissions controlled by the specific user.

FIG. 2 is a block diagram showing the information flow, in accordance with an embodiment of the present invention, of the task 12 of FIG. 1, wherein the information type and set of data fields are obtained by parsing by an artificial intelligence engine, which is executed either on the computing device or the server system. Information type definitions 22 stored in the taxonomy database 21 are used to train an artificial intelligence engine 23. The artificial intelligence engine 23 (located on the computing device or on the server system) receives a set of items 24 and determines an information type and a set of data fields 25. The information type and set of data fields 25 are then fed into the process 13 of FIG. 1.

FIG. 3 is a block diagram showing information flow, in accordance with an embodiment of the present invention, of the task 13 of FIG. 1, which derives information from an artificial intelligence engine. The new information 31, relevant metadata information 32, and other user information stored in association with an internal account of the specific user 33, is fed to an artificial intelligence engine 34, being a component of the server system, in order to produce, from the artificial intelligence engine, derived information 35 selected from the group consisting of contact information, event information, inferred information, and relationships between the new information and the other user information. The derived information is then fed to the process 14 of FIG. 1.

Figure 4:
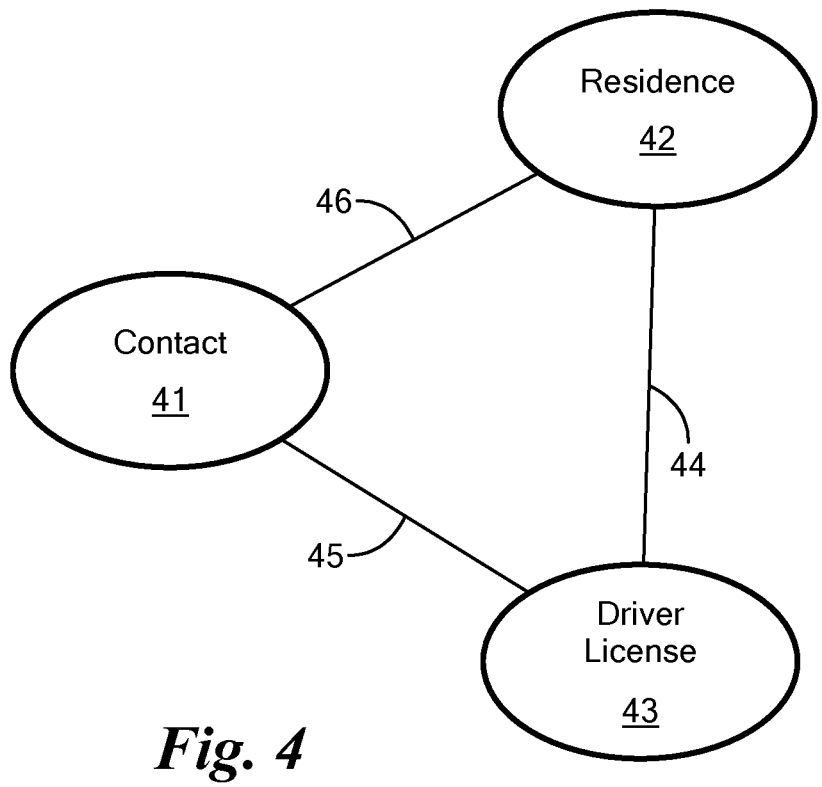
FIG. 4 is a relationship diagram of an embodiment of the present invention showing relationships among new information and related associations derived by task 13 of FIG. 1, where the set of items of information is a driver's license.

FIG. 4 is a relationship diagram of an embodiment of the present invention showing relationships among new information and derived information by task 13 of FIG. 1, where the set of items of information is a driver's license. As described in FIG. 3, the artificial intelligence engine, being a component of the server system, produces derived information from the group consisting of new information, metadata information, and other user information stored in association with an internal account of the specific user. In this example of the driver license, the derived information is a contact 41, with its associated data fields, which can be the name and date of birth; and a residence 42, with its associated data fields, which can be the street address. The artificial intelligence engine also produces associations (represented by lines 44, 45 and 46) between the new information (the driver license 43), and the derived information (the contact 41 and the residence 42).

FIGS. 5A through 5F are a series of representations of screens experienced by a user, showing an aspect of the user interface on a user's computing device, in accordance with an embodiment of the present invention, by which a driver license is added by the user to the user's account.

Figure 5A:
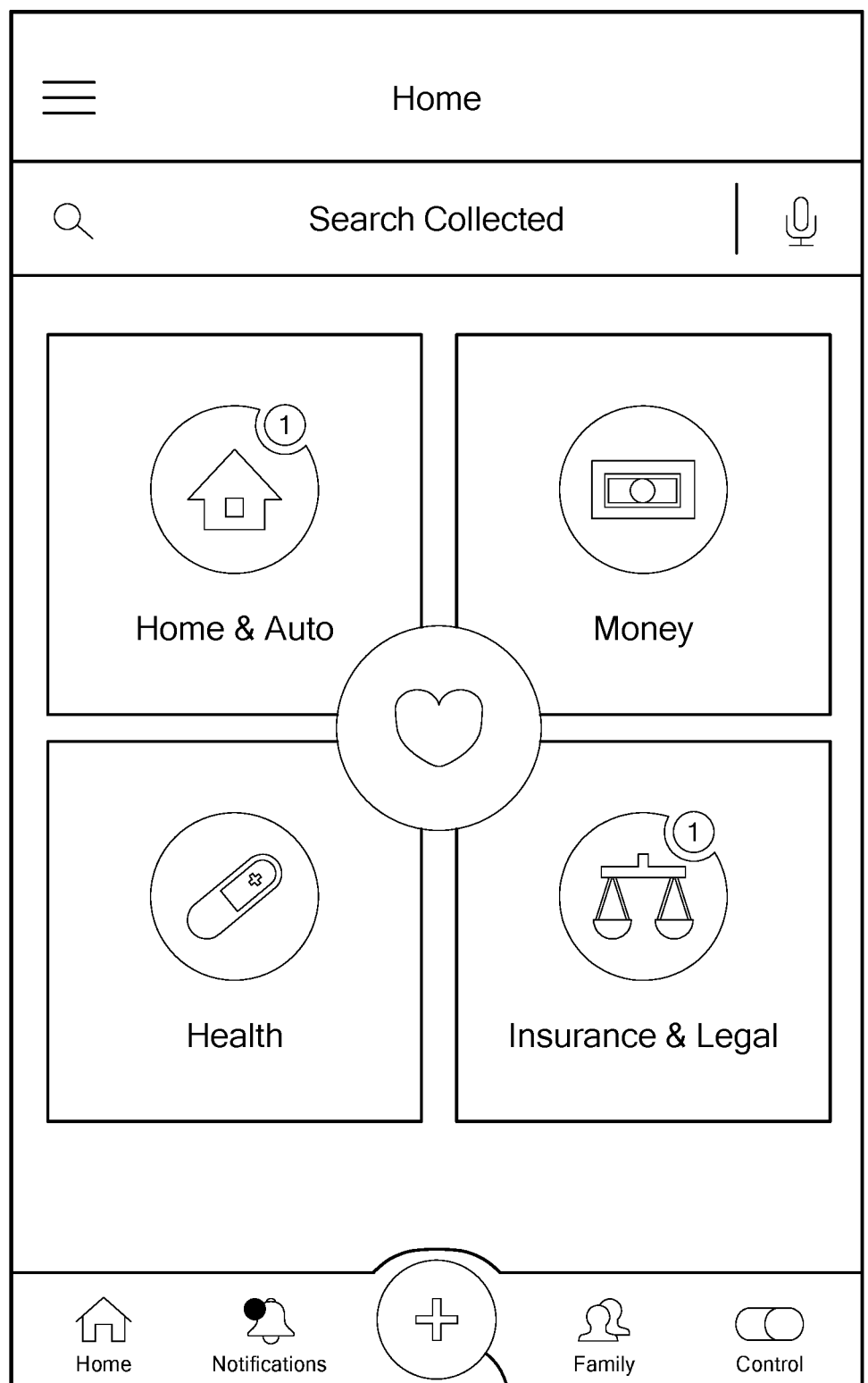

FIG. 5A shows the home screen on the computing device, by which a user selects the "plus" (+) icon 51 to add information to his internal account.

Figure 5B:
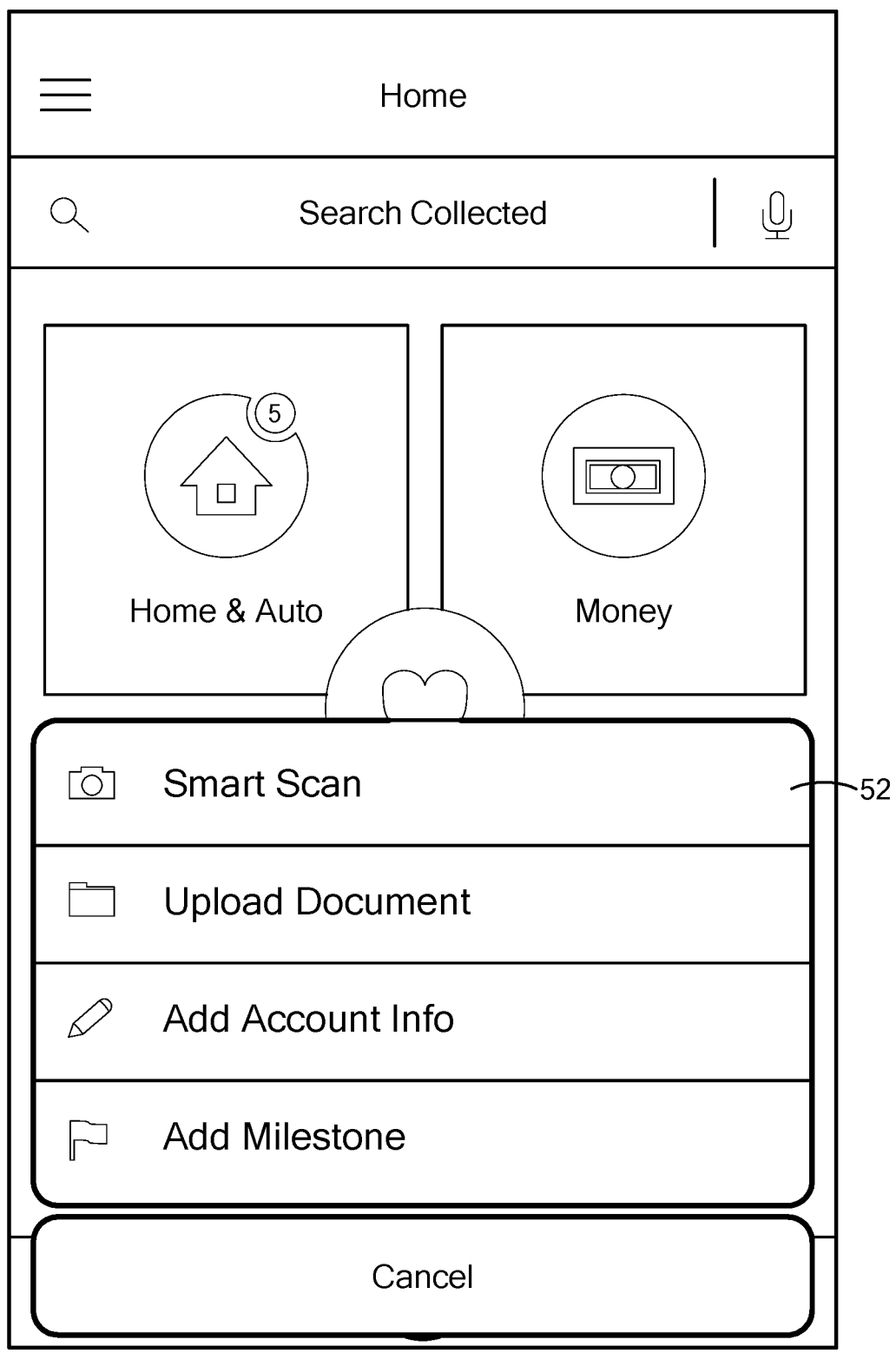

FIG. 5B shows the screen on the computing device, by which a user selects "Smart Scan" 52 from a list of options that additionally include "Upload Document," "Add Account Info," and "Add Milestone."

Figure 5C:
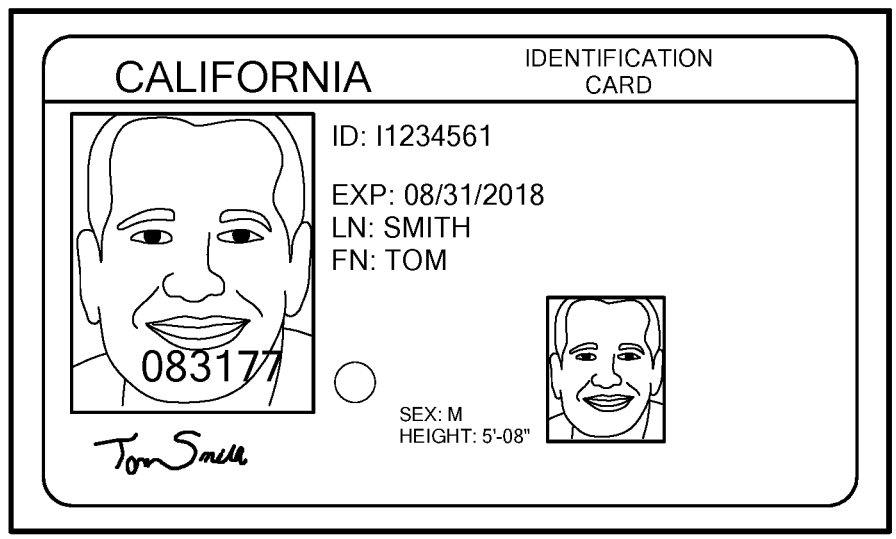

FIG. 5C shows the screen on the computing device, by which a user clicks on the camera button 53 to take a picture of the front side of the driver license, which would typically have been placed on a table or similar flat surface. In a further related embodiment, the camera detects the edges of the document (the driver's license) and takes the picture automatically.

Figure 5D:
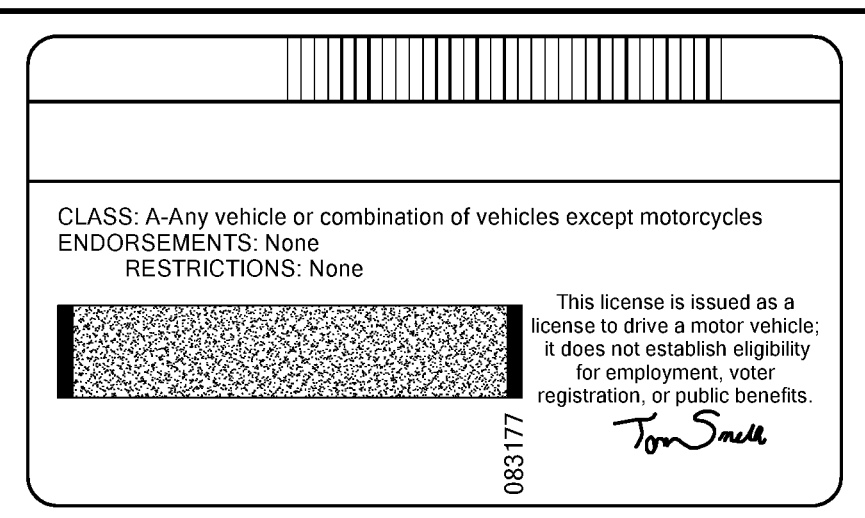

FIG. 5D shows the screen on the computing device by which a user clicks on the camera button 54 to take a picture of the back side of the driver license, similarly placed on a table or similar flat surface. In the further related embodiment, again, the camera detects the edges of the document (the driver's license back side) and takes the picture automatically.

FIG. 5E shows the screen on the computing device displaying the information type and the set of data fields 55 extracted during process 12 of FIG. 1. This process is also described in connection with FIG. 2, in relation to parsing of the received set of items (the driver license) to derive the information type and the set of data fields. In this FIG. 5E, the user confirms the information type and the set of data fields by clicking on the prompt "The info is correct" 56. The user can also change the information type or some of the data fields by clicking "Edit" on this screen.

Figure 5F:
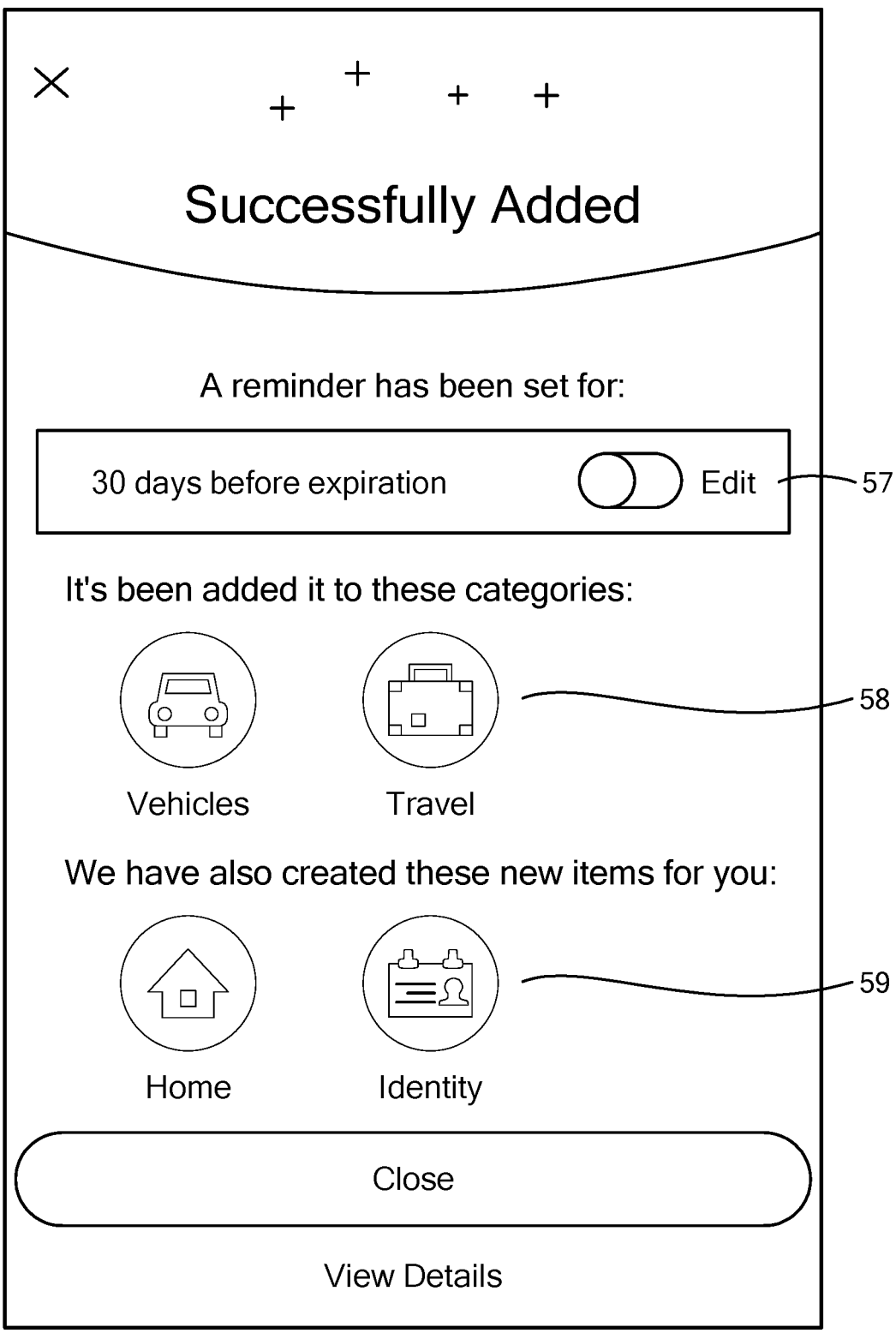

FIG. 5F shows the screen on the computing device with some of the derived information produced by the artificial intelligence engine in process 13 of FIG. 1. An alert event 57 has been derived from the expiration date data field, with a reminder automatically set for 30 days in advance, based on the information type definitions 32 of the taxonomy database. A set of contextual categories 58 pertinent to components of the new information is also shown. The display also shows a set of contextual categories 59 pertinent to components of the derived information. (FIG. 7 also shows a summary of the new and derived information in the example of a driver's license.)

Figure 6A:
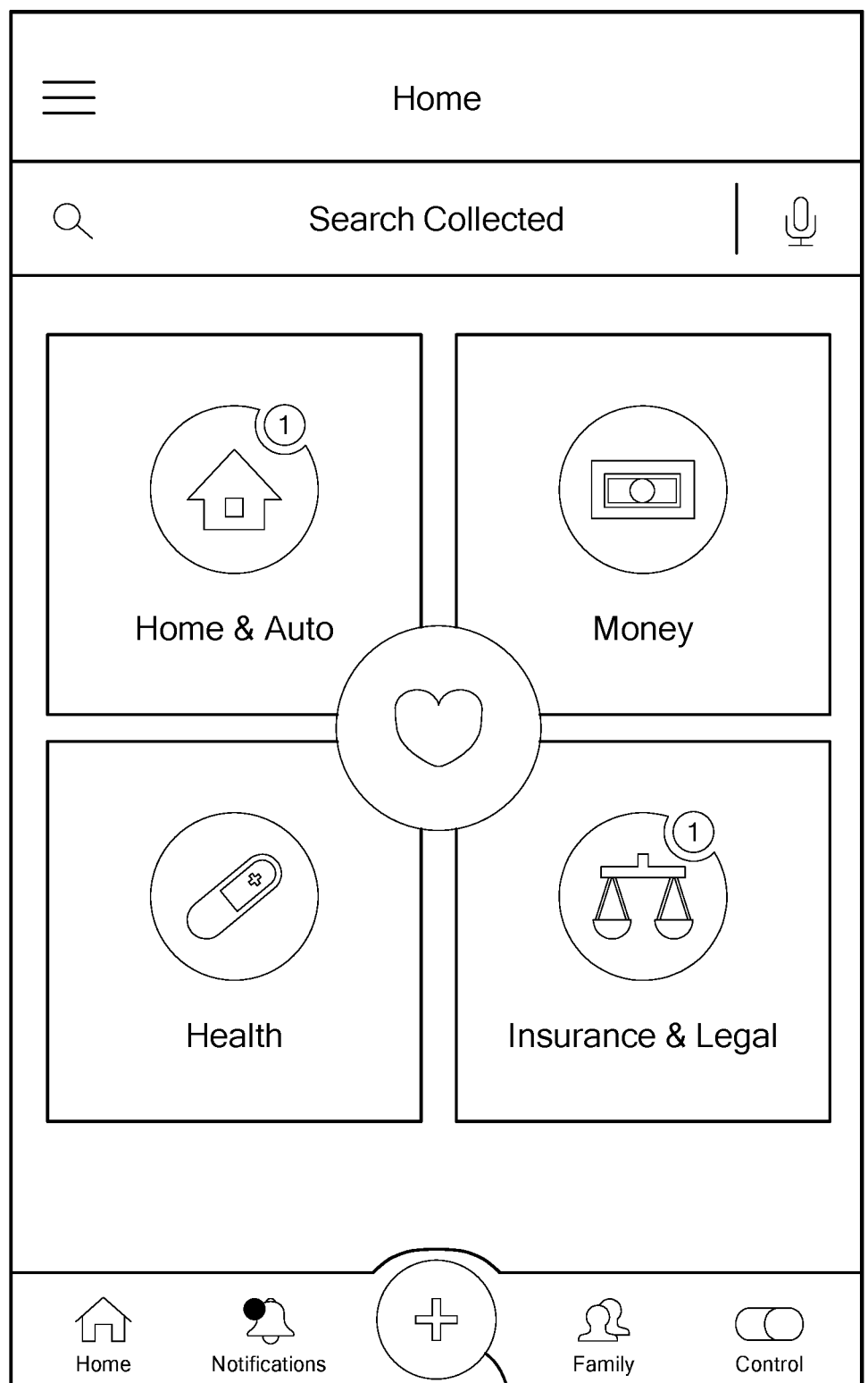
FIGS. 6A though 6F are a series of representations of screens experienced by a user, showing an aspect of the user interface on a user's computing device, in accordance with an embodiment of the present invention, by which a set of three documents is uploaded by the user.

FIGS. 6A though 6F are a series of representations of screens experienced by a user, showing an aspect of the user interface on a user's computing device, in accordance with an embodiment of the present invention, by which a set of three documents is uploaded by the user.

FIG. 6A shows the home screen on the computing device by which a user selects the "plus" (+) icon 61 to add information to his internal account.

Figure 6B:
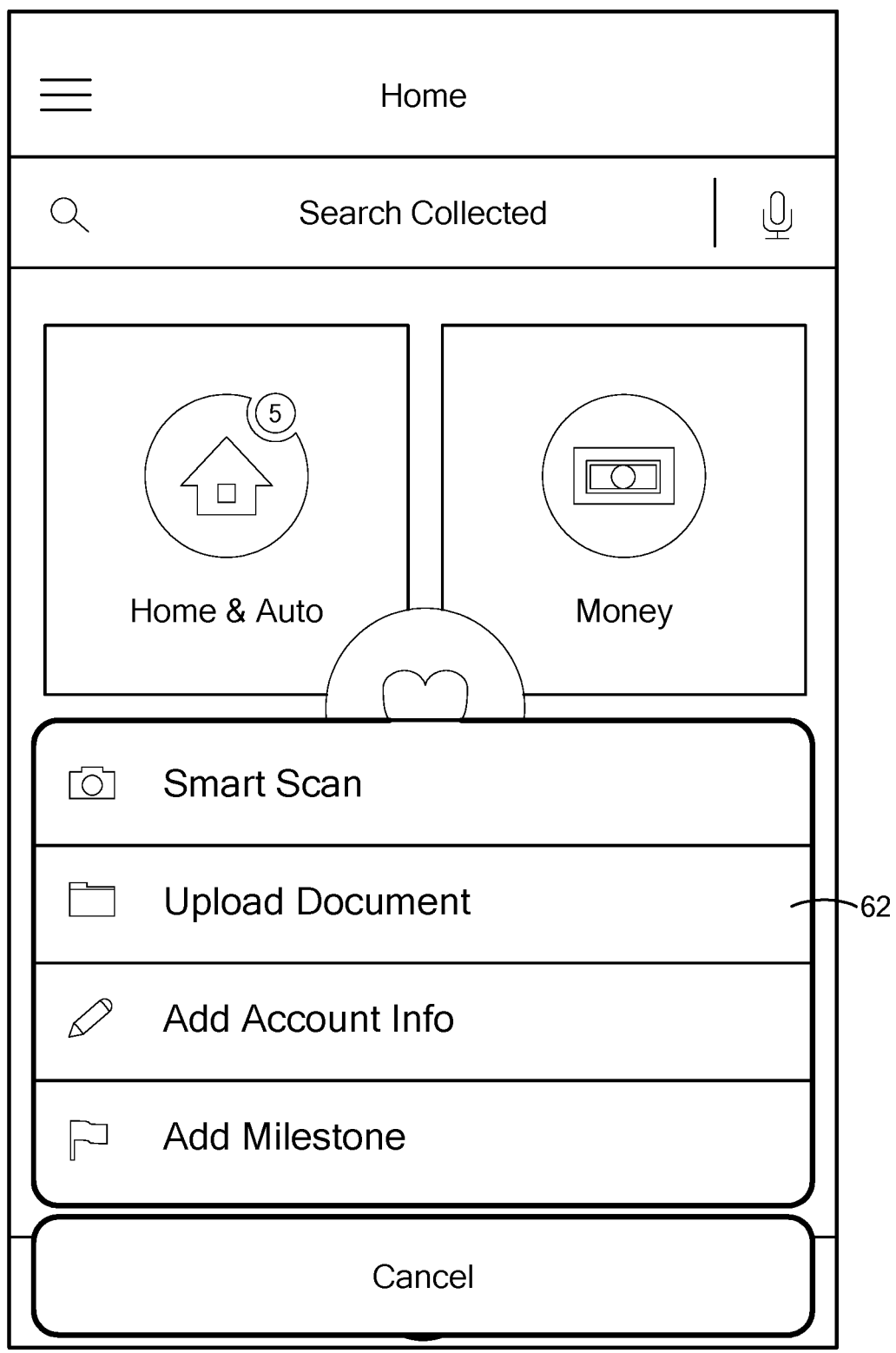

FIG. 6B shows the screen on the computing device by which the user selects "Upload Document" 62 from the list of options.

Figure 6C:
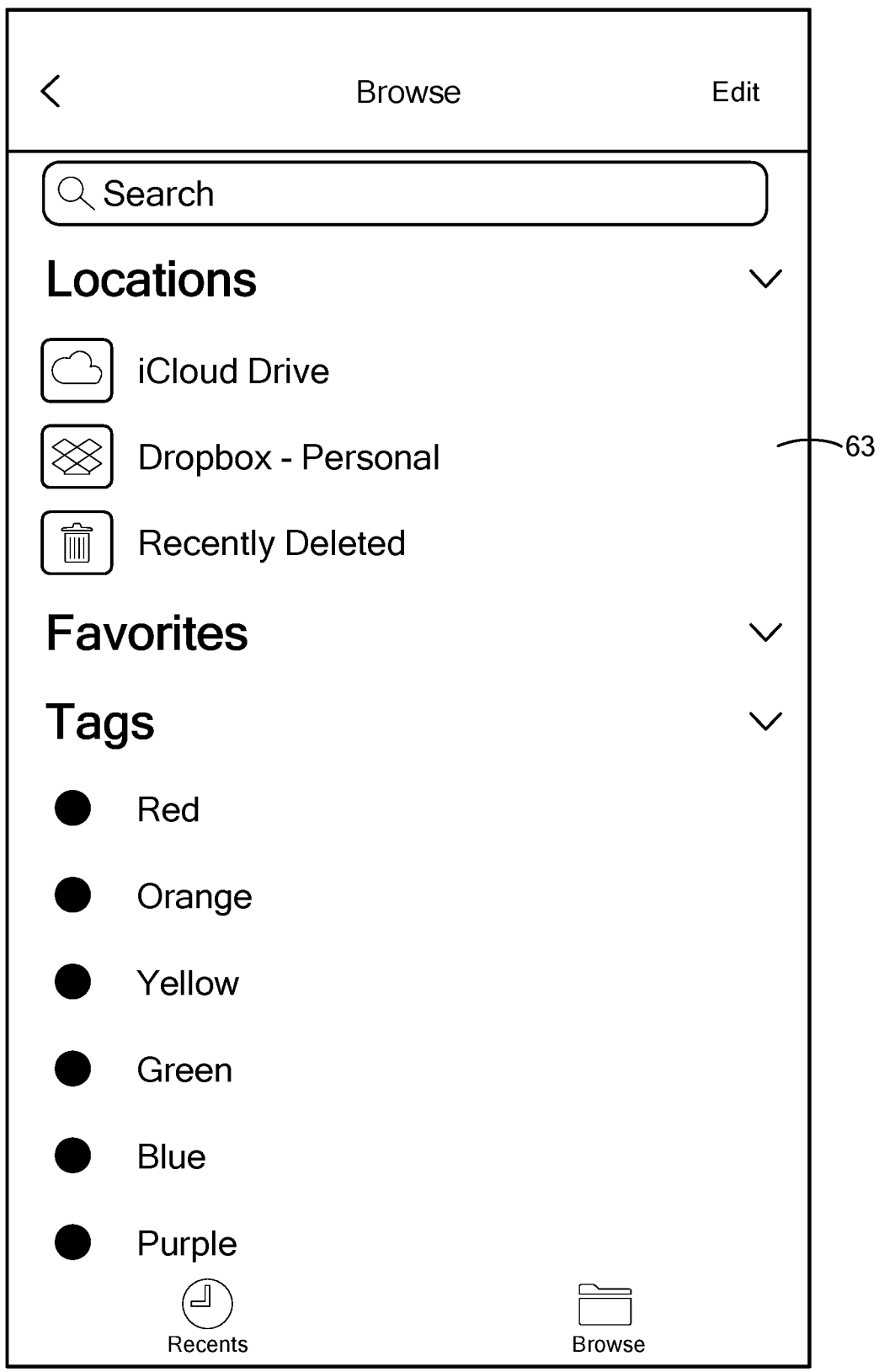

FIG. 6C shows a screen on the computing device by which the user selects the location 63 of the set of digital files to be uploaded to the server system.

Figure 6D:
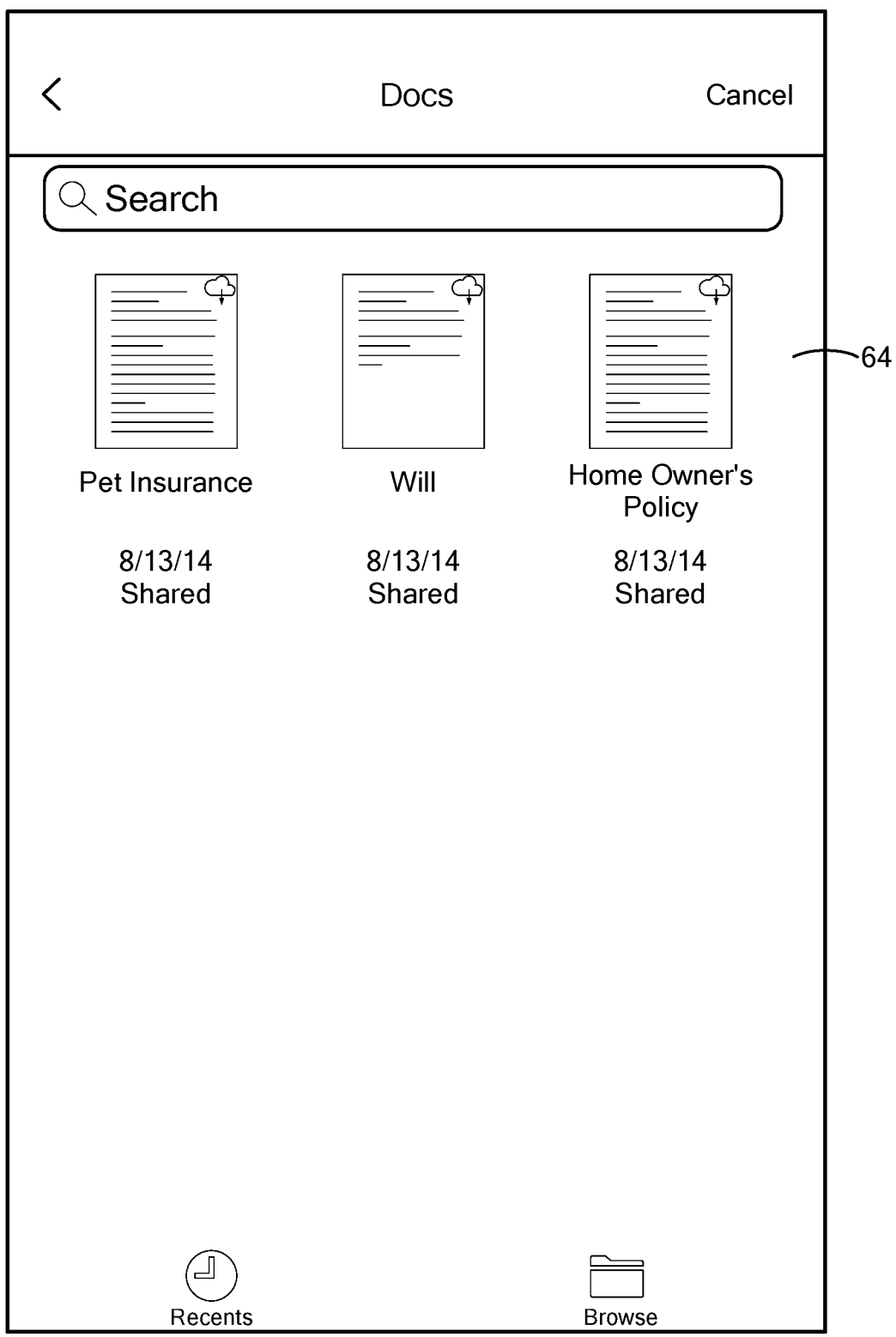

FIG. 6D shows a screen on the computing device by which the user selects the digital files 64 to be uploaded to the server system.

Figure 6E:
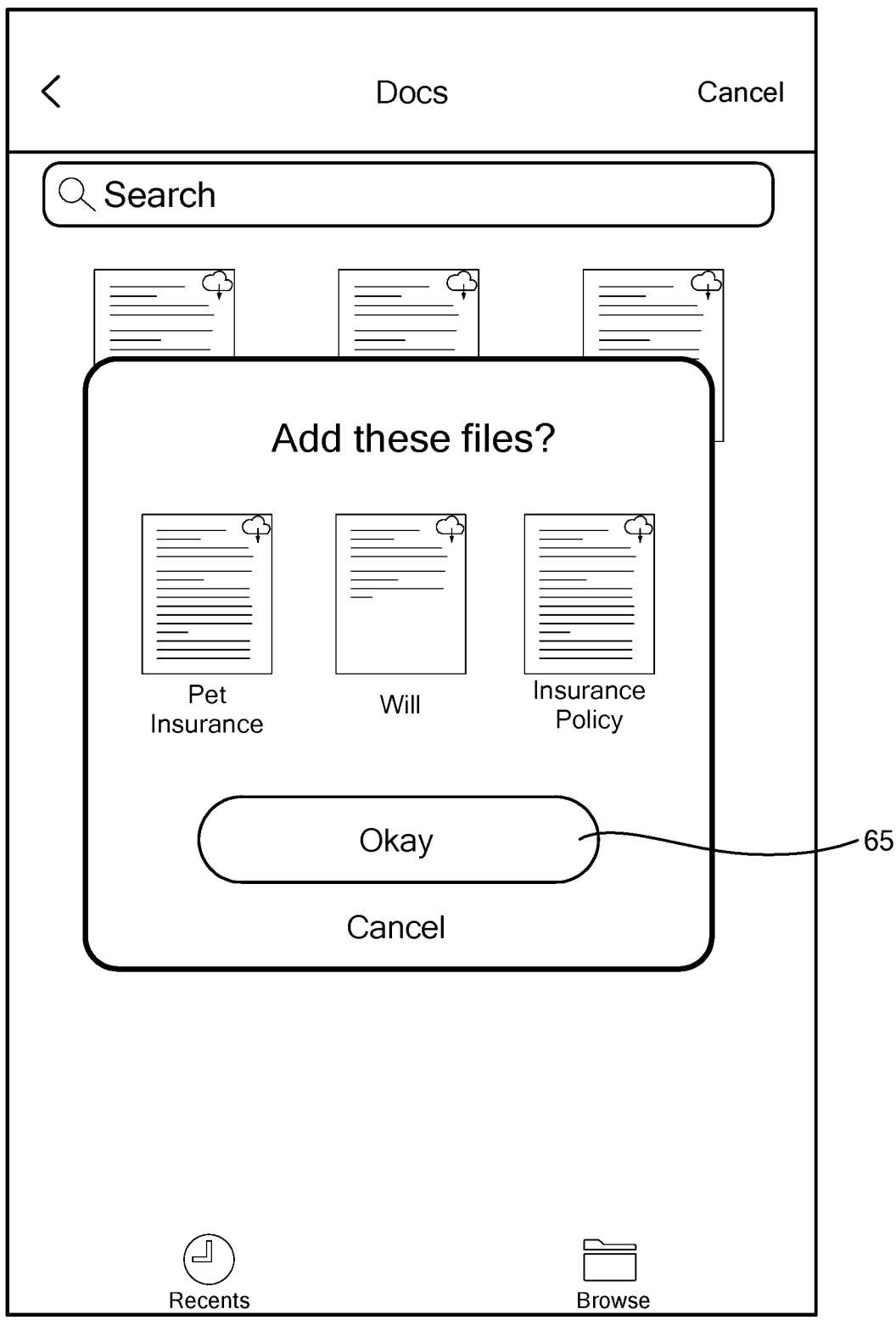

FIG. 6E shows a screen on the computing device by which the user confirms by selecting the Okay icon 65, the set of digital files to be uploaded to the server system.

Figure 6F:
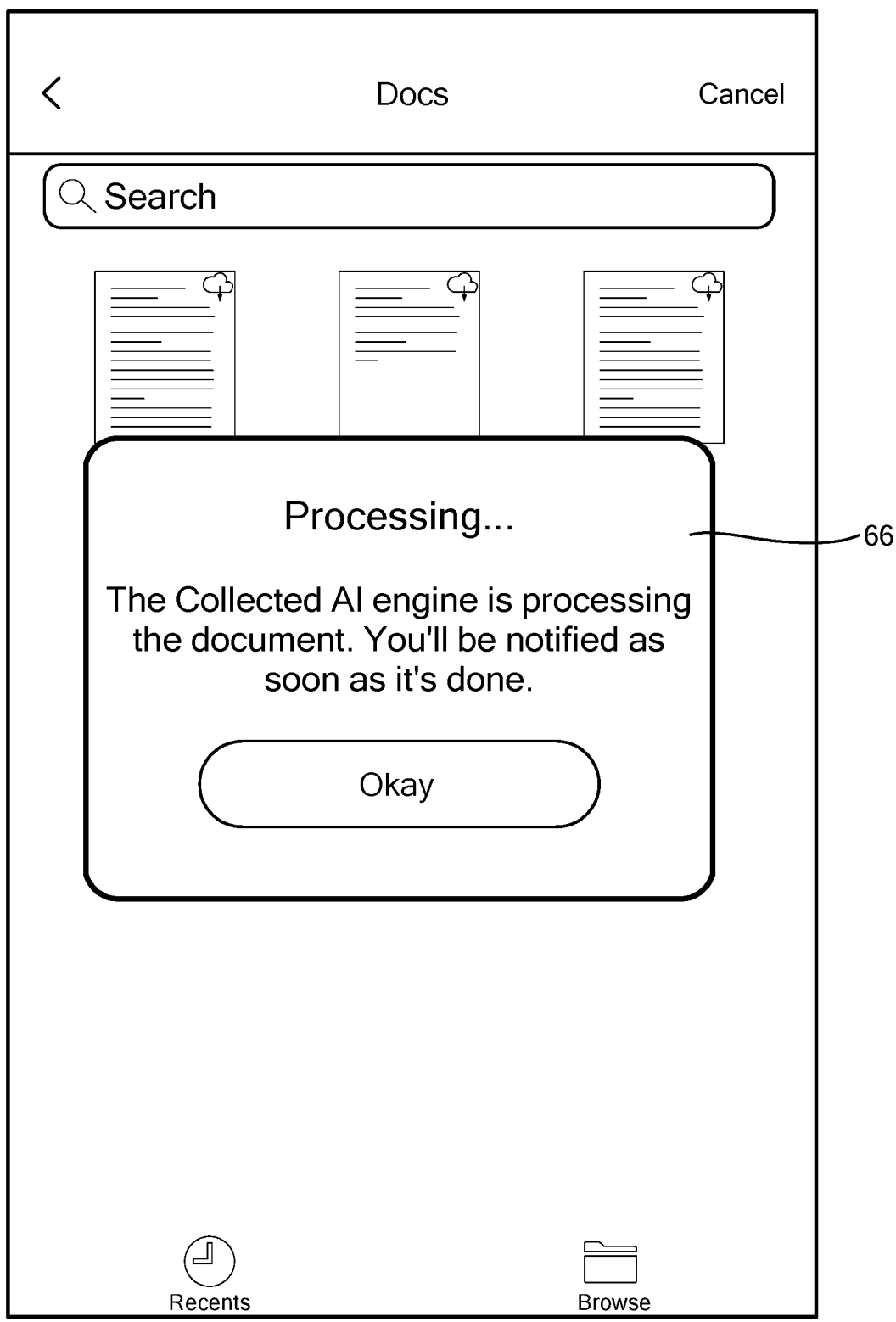

FIG. 6F shows a screen on the computing device by which the user is informed that the set of items of information is being sent by the computing device to the server system and is being processed on the server system, (and a notification will be sent to the user of the internal user account when the processing is completed and ready to be reviewed by the user). Once the user confirms, the process flow of FIG. 1 is then started, with the server system receiving the set of items of information as indicated by process 11 of FIG. 1.

Figure 7:
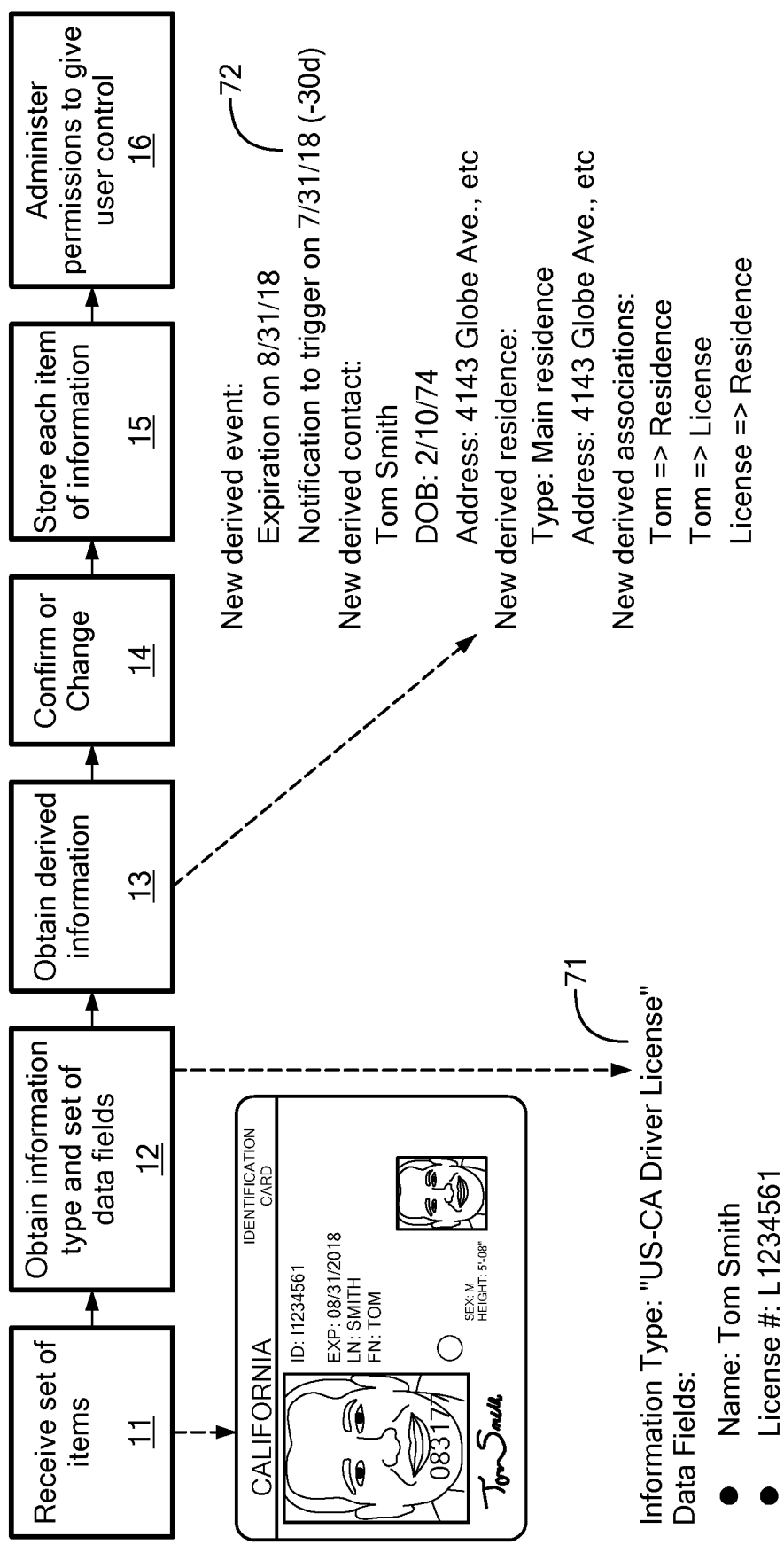
FIG. 7 is a diagram showing operation of the processes of FIG. 1, in accordance with an embodiment of the present invention, in processing information extracted from the driver's license of FIGS. 5A through 5F.

FIG. 7 is a diagram showing operation of the processes of FIG. 1, in accordance with an embodiment of the present invention, in processing information extracted from the driver's license of FIGS. 5A through 5F. In process 12, in this example, the new information obtained 71 includes the information type "US-CA driver's license" and the data fields consisting of the name, the license number, the address, the date of birth and the expiration date. In process 13, still in this example of the driver's license, the derived information 72 includes a new derived event "Expiration"; a new derived contact "Tom Smith"; a new derived residence and the derived associations between the contact, the residence and the driver's license, as represented also by FIG. 4.

Figure 8:
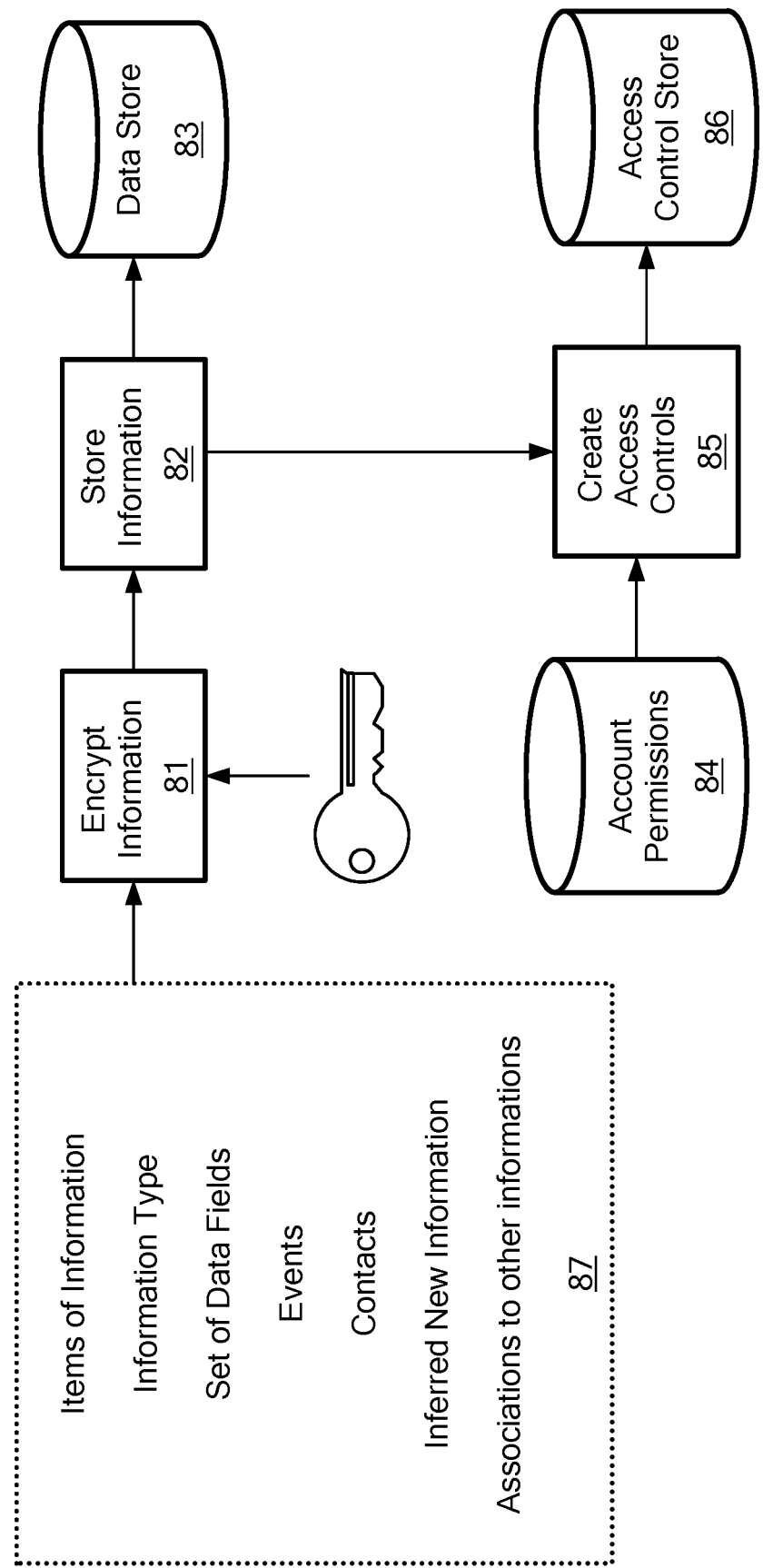
FIG. 8 is a block diagram showing process flow, in accordance with an embodiment of the present invention, by which received items of information, and new items of information and derived information are handled in relation to encryption, storage, permissions, sharing, and access.

FIG. 8 is a block diagram showing process flow, in accordance with an embodiment of the present invention, by which received items of information, and new items of information and derived information are handled in relation to encryption, storage, permissions, sharing, and access. The items of information, the new information and the derived information, as represented by 87 in FIG. 8, are encrypted by process 81, and then stored by process 82 in a storage system 83 in communication with the server system. Based on the account permissions 84, the process 85 then creates the permissions for access control, which are then stored in the access control data store 86.

Figure 9:
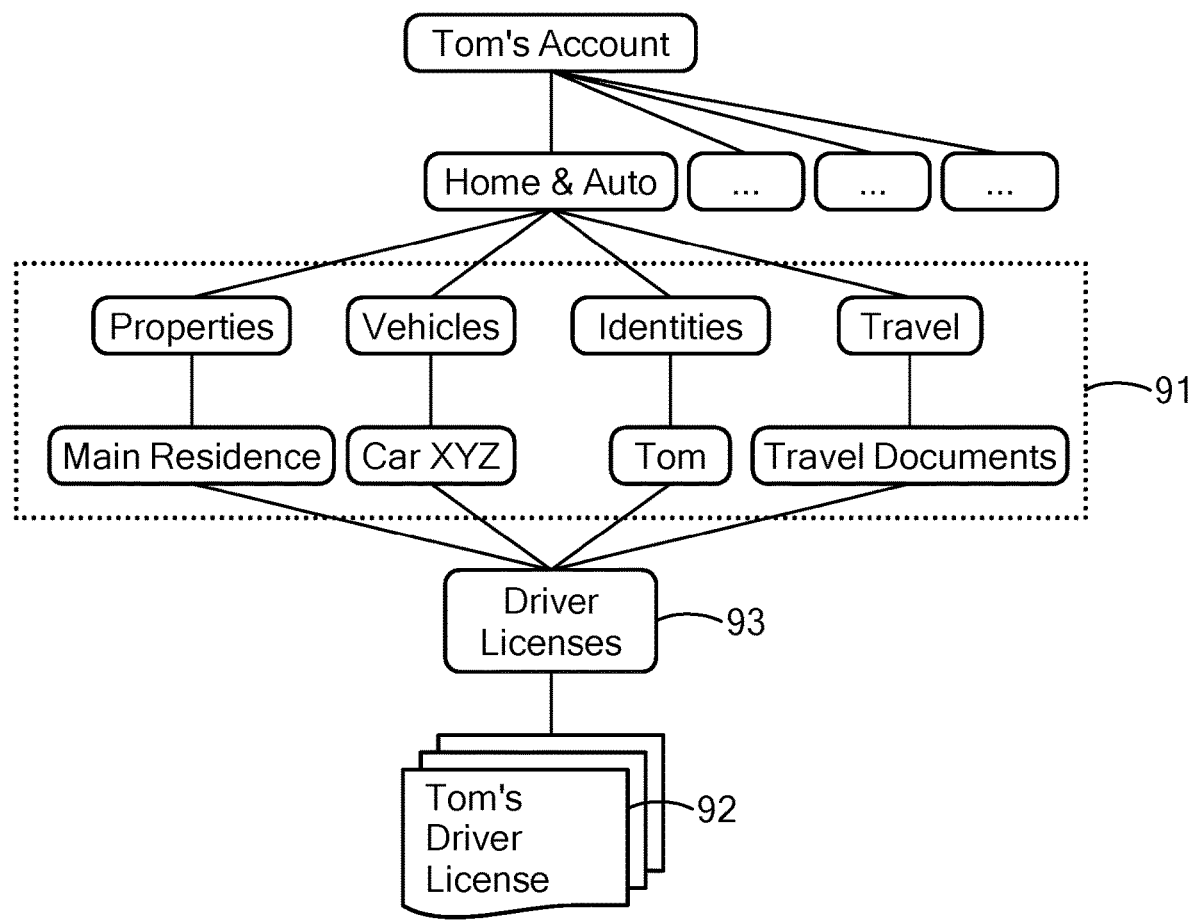
FIG. 9 is block diagram showing a hierarchy of contextual categories, in accordance with an embodiment of the present invention, used in organizing personal information of a user, in this case information associated with the user's driver's license.

FIG. 9 is block diagram showing a hierarchy of contextual categories, in accordance with an embodiment of the present invention, used in organizing personal information of a user, in this case information associated with the user's driver's license. Based on the attributes of the components of the new information and the derived information, a set of contextual categories 91 are derived. The new information "Tom's driver license" 92 has an information type "Driver licenses" 93 that is associated to the derived information residence "Main residence", the derived information contact "Tom" and to derived contextual categories "Vehicles" and "Travel documents". Additionally, the derived information residence is associated in a hierarchical manner to a contextual category "Properties", and the derived information contact is associated in a hierarchical manner to a contextual category "Identities".

Figure 10:
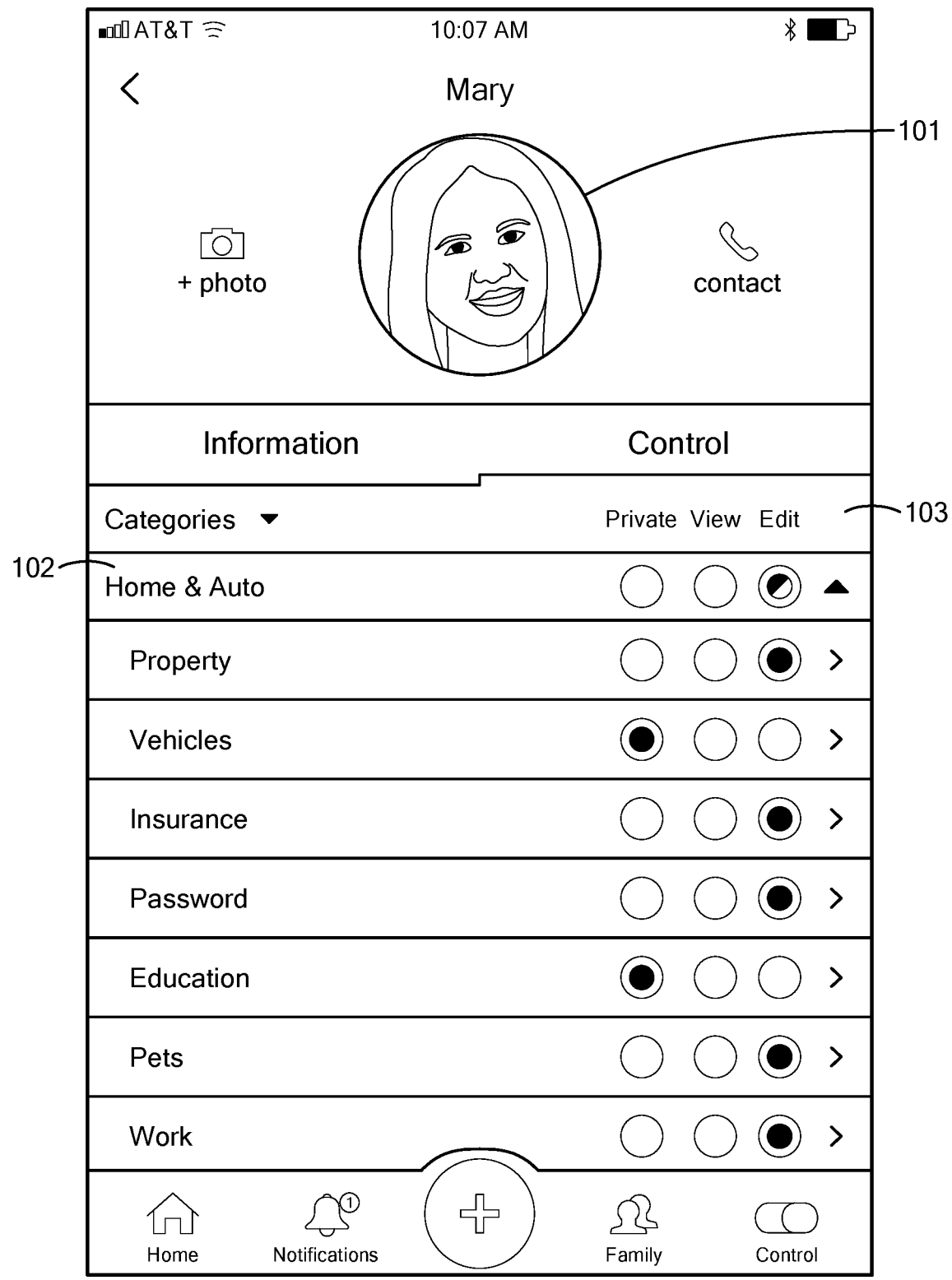
FIG. 10 is a representation of a screen experienced by a user, showing an aspect of the user interface on a user's computing device, in accordance with an embodiment of the present invention, by which a user defines default permissions for a family member who in this case is a spouse of the user.

FIG. 10 is a representation of a screen experienced by a user, showing an aspect of the user interface on a user's computing device, in accordance with an embodiment of the present invention, by which a user defines default permissions for a family member who in this case is a spouse (Mary) 101 of the user (Tom). A predefined list of hierarchically arranged contextual categories 102 is showed to the user. Permissions 103 can be assigned at any levels of contextual categories. For example, permissions can be defined at the "Home & Auto" level, which would include all contextual categories hierarchically under the "Home & Auto" contextual category. As further example, when permissions are, as before, defined at the "Home & Auto" level, the permissions at a lower level of contextual categories, such as "Vehicles" and "Education," can be modified. FIG. 10 shows this further example where the user Tom assigned "Edit" permissions to Mary at "Home & Auto" level, and then changed the lower level contextual categories "Vehicles" and "Education" to have permissions "Private". These permissions are then used, before storing new information and derived information that are pertinent to a specific item of information, for sharing of the new information and the derived information in accordance with these default user sharing selections.

Figure 11A:
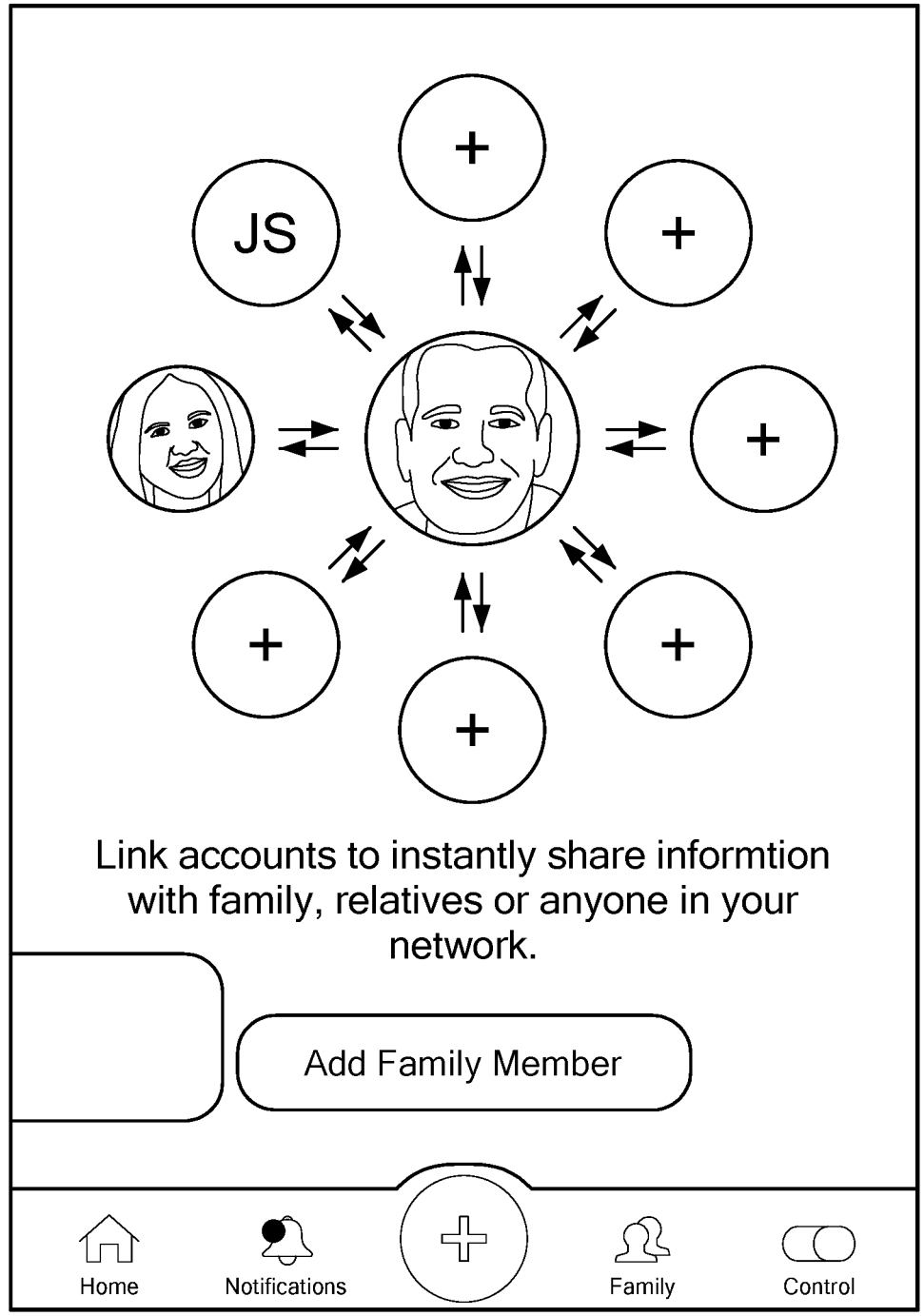
FIG. 11A is a representation of a screen experienced by a user, showing an aspect of the user interface on a user's computing device, in accordance with an embodiment of the present invention, by which a user links accounts with a family member or anyone else in the user's network to instantly share information therewith.

FIG. 11A is a representation of a screen experienced by a user, showing an aspect of the user interface on a user's computing device, in accordance with an embodiment of the present invention, by which a user links accounts with a family member or anyone else in the user's network to instantly share information therewith.

Figure 11B:
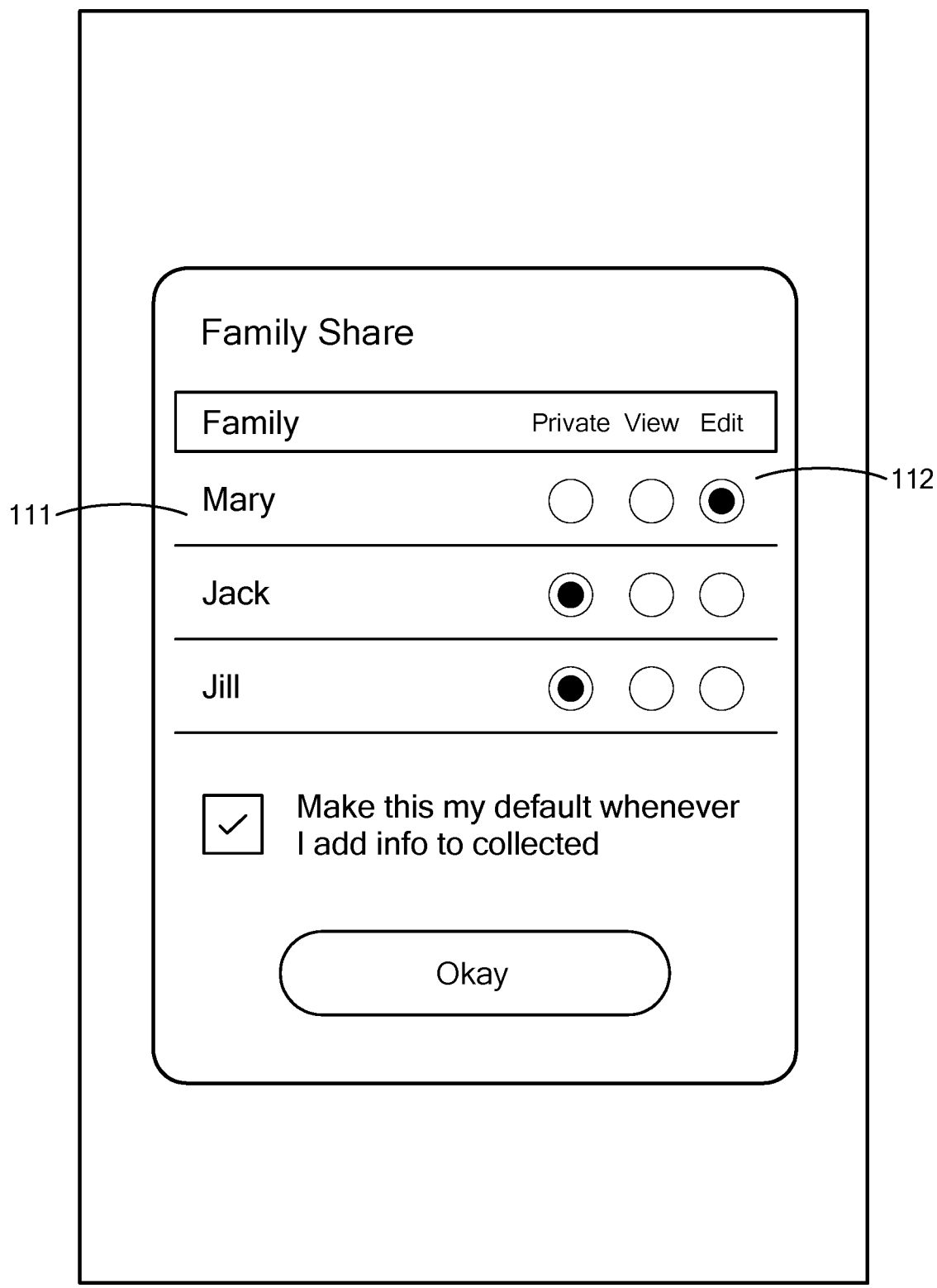
FIG. 11B is a representation of a screen experienced by a user, showing an aspect of the user interface on a user's computing device, in accordance with an embodiment of the present invention, by which a user confirms or changes permissions for a family member with respect to information that has been newly added to the account.

FIG. 11B is a representation of a screen experienced by a user, showing an aspect of the user interface on a user's computing device, in accordance with an embodiment of the present invention, by which a user confirms or changes permissions for a family member with respect to information that has been newly added to the account. The generated prompt to the specific user, to make a selection concerning sharing preferences for the specific items of information, shows the list of family members 111 defined in the user's internal account. The user can then specify permissions 112 for the new information and derived information that are pertinent to a specific item of information, causing sharing of such information accordingly.

Figure 12:
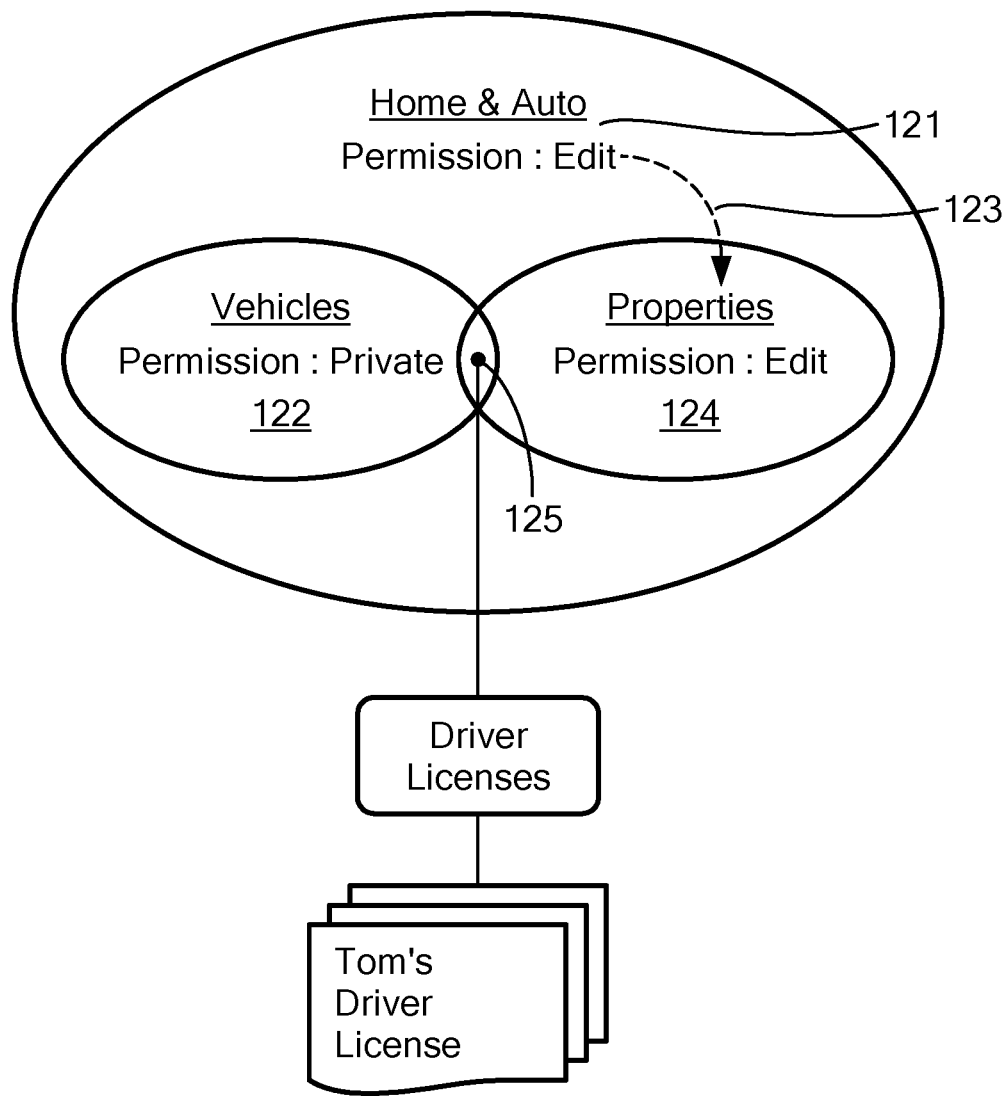
FIG. 12 is a diagram showing an example of how default permissions are defined based on a set of permissions assigned to hierarchically arranged contextual categories.

FIG. 12 is a diagram showing an example of how default permissions are defined based on a set of permissions assigned to hierarchically arranged contextual categories. As described in the example of FIG. 9, the driver license is directly or indirectly associated to different contextual categories, including "Vehicles" and "Properties". FIG. 12 shows an example where "edit" permission 121 has been assigned to the contextual category "Home & Auto" and "private" permission 122 has been assigned to the lower level contextual category "Vehicles" (which is a child of "Home & Auto). Since the contextual category "Properties" is also a child of the contextual category "Home & Auto", and since no specific permission has been assigned to the contextual category "Properties", as in example showed in FIG. 10, the permission "edit" from the parent contextual category "Home & Auto" is inherited (as indicated by dashed arrow 123) by the child contextual category "Properties" 124. Since the driver license is associated to both "Vehicles" and "Properties" 125, the most permissive permission "edit" is then defined as the default permission for the specific set of new and derived information, for the specific family member.

FIGS. 13A through 13E are a series of representations of screens experienced by a user, showing an aspect of the user interface on a user's computing device, in accordance with an embodiment of the present invention, by which the user causes display of information related to an account asset of the user.

Figure 13A:
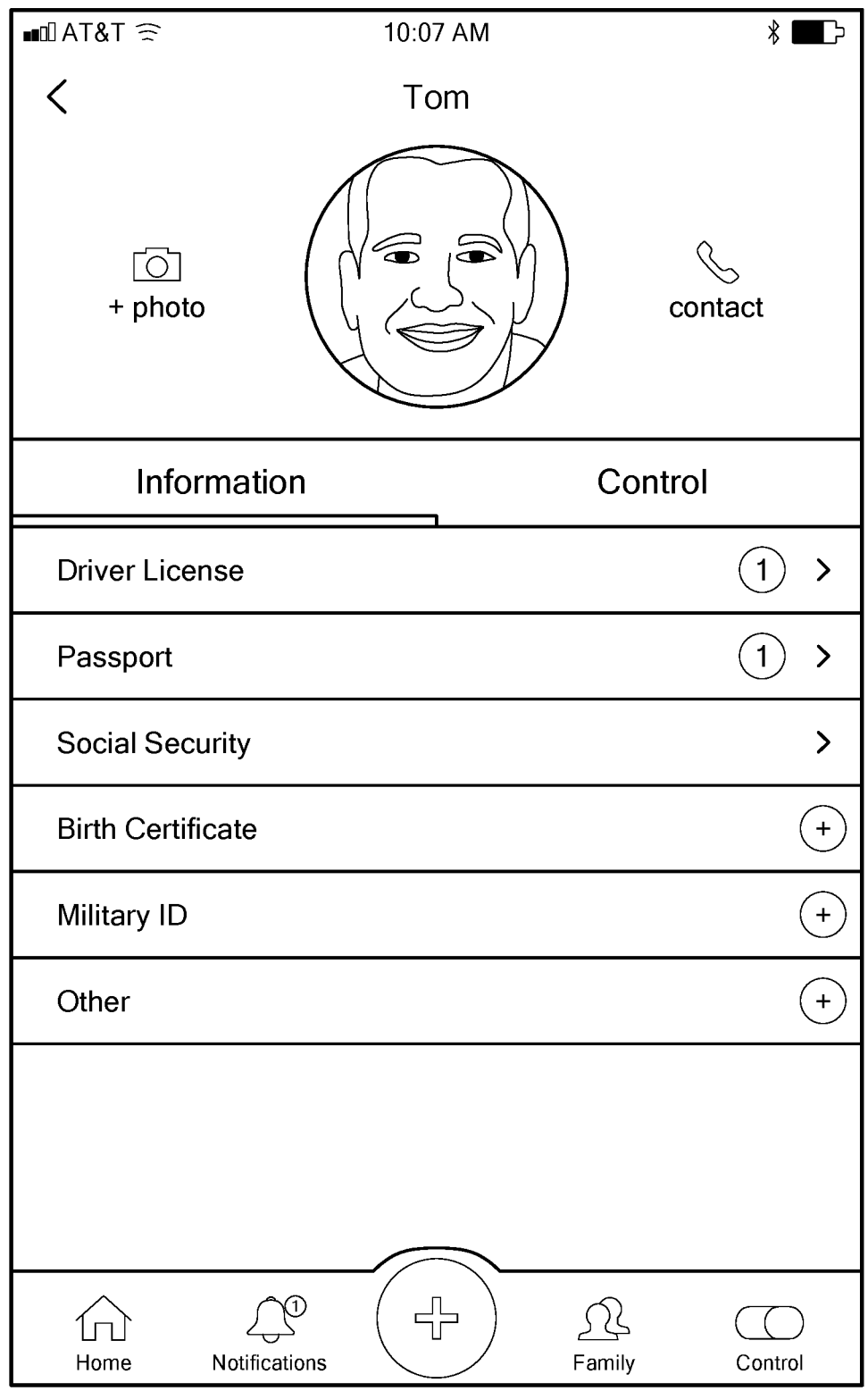
FIGS. 13A through 13E are a series of representations of screens experienced by a user, showing an aspect of the user interface on a user's computing device, in accordance with an embodiment of the present invention, by which the user causes display of information related to an account asset of the user.

FIG. 13A shows an example of an account asset of the user where the account asset is a contact. In this example, the screen shows all the information related to "Tom", the account asset, which consists of members selected from the group consisting of contextual categories and information types pertinent to the specific account asset. It includes information added by the specific user of the internal account, information added by other users for the specific user of the internal account, and information shared by family members of the specific user of the internal account, all related to the specific account asset contextual category. For instance, and in further clarification, the "passport" may have been added by "Mary," a family member of Tom's family, into her own internal account, and shared with Tom.

Figure 13B:
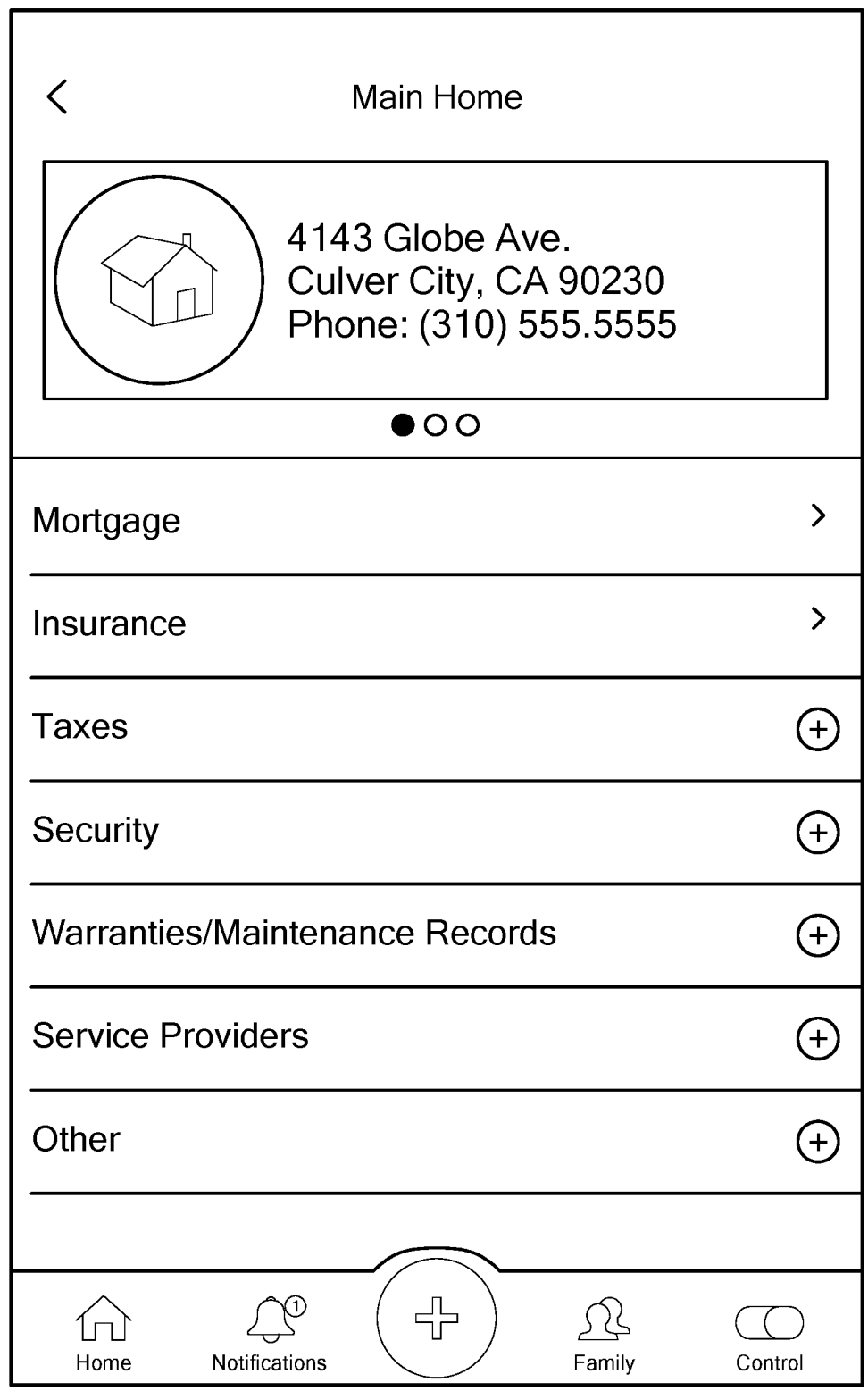

FIG. 13B shows an example of an account asset of the user where the account asset is a residence. In this example, the screen shows all the information related to "Main Home", the account asset, which consists of members selected from the group consisting of contextual categories and information types pertinent to the specific account asset. It includes information added by the specific user of the internal account, information added by other users for the specific user of the internal account, and information shared by family members of the specific user of the internal account, all related to the specific account asset contextual category. For instance, and in further clarification, the "Mortgage" may have been added by "Mary", a family member of Tom's family, into her own internal account, and shared with Tom.

Figure 13C:
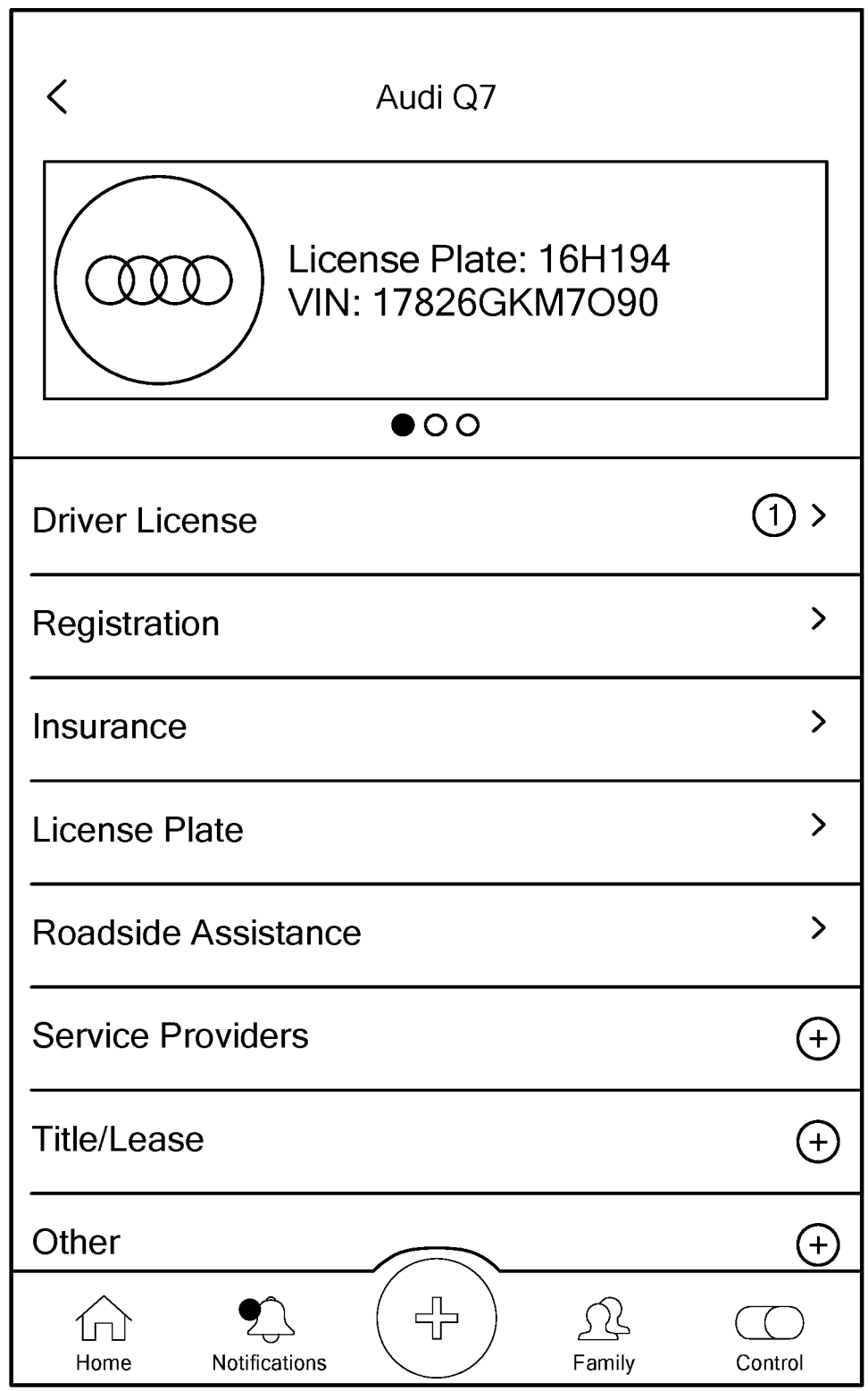

FIG. 13C shows an example of an account asset of the user where the account asset is a vehicle. In this example, the screen shows all the information related to "Audi Q7", the account asset, which consists of members selected from the group consisting of contextual categories and information types pertinent to the specific account asset. It includes information added by the specific user of the internal account, information added by other users for the specific user of the internal account, and information shared by family members of the specific user of the internal account, all related to the specific account asset contextual category. For instance, and in further clarification, the "Registration" may have been added by "Mary", a family member of Tom's family, into her own internal account, and shared with Tom.

Figure 13D:
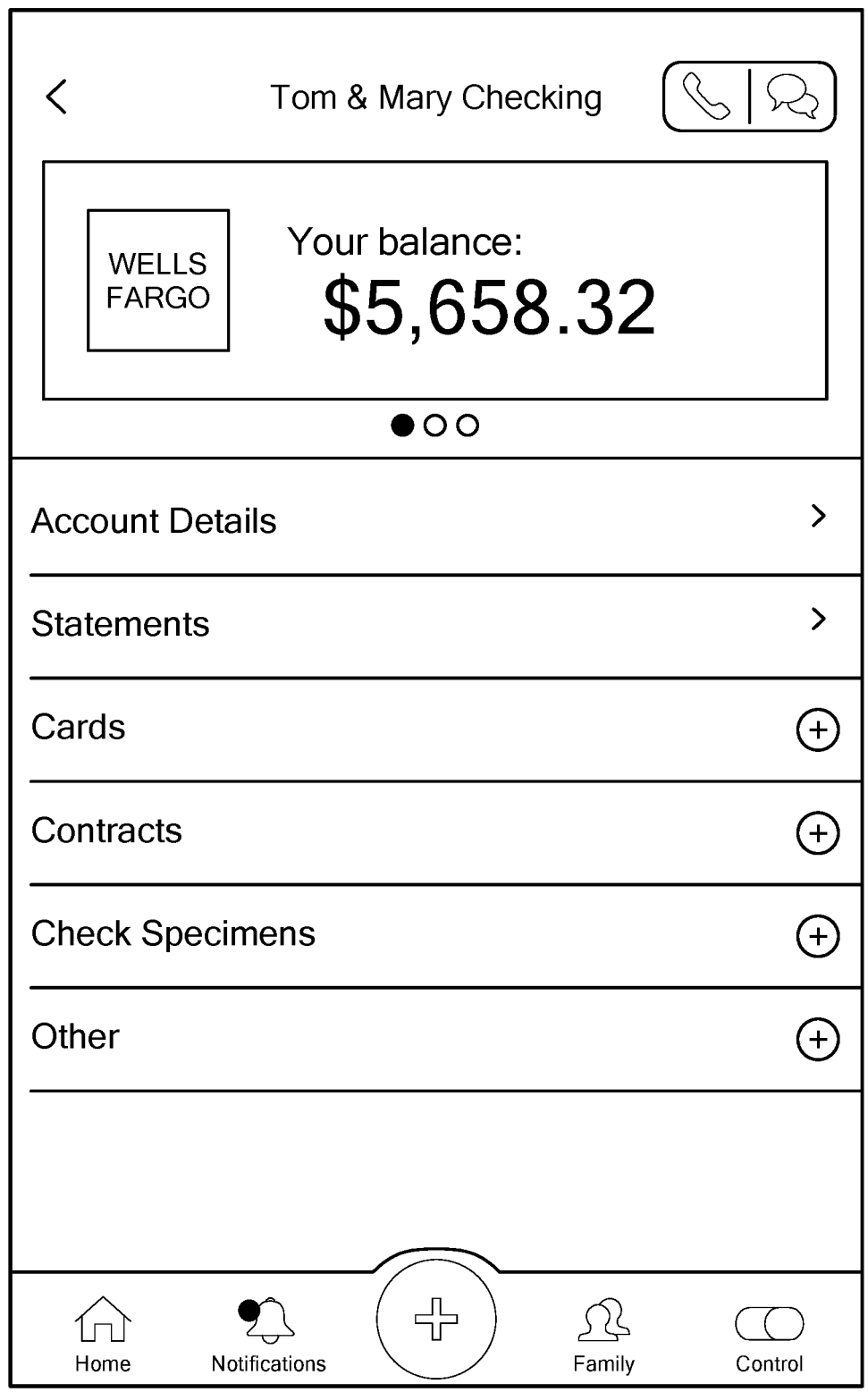

FIG. 13D shows an example of an account asset of the user where the account asset is a bank account. In this example, the screen shows all the information related to "Tom & Mary Checking", the account asset, which consists of members selected from the group consisting of contextual categories and information types pertinent to the specific account asset. It includes information added by the specific user of the internal account, information added by other users for the specific user of the internal account, and information shared by family members of the specific user of the internal account, all related to the specific account asset contextual category. For instance, and in further clarification, the "Account Details" may have been added by "Mary", a family member of Tom's family, into her own internal account, and shared with Tom.

Figure 13E:
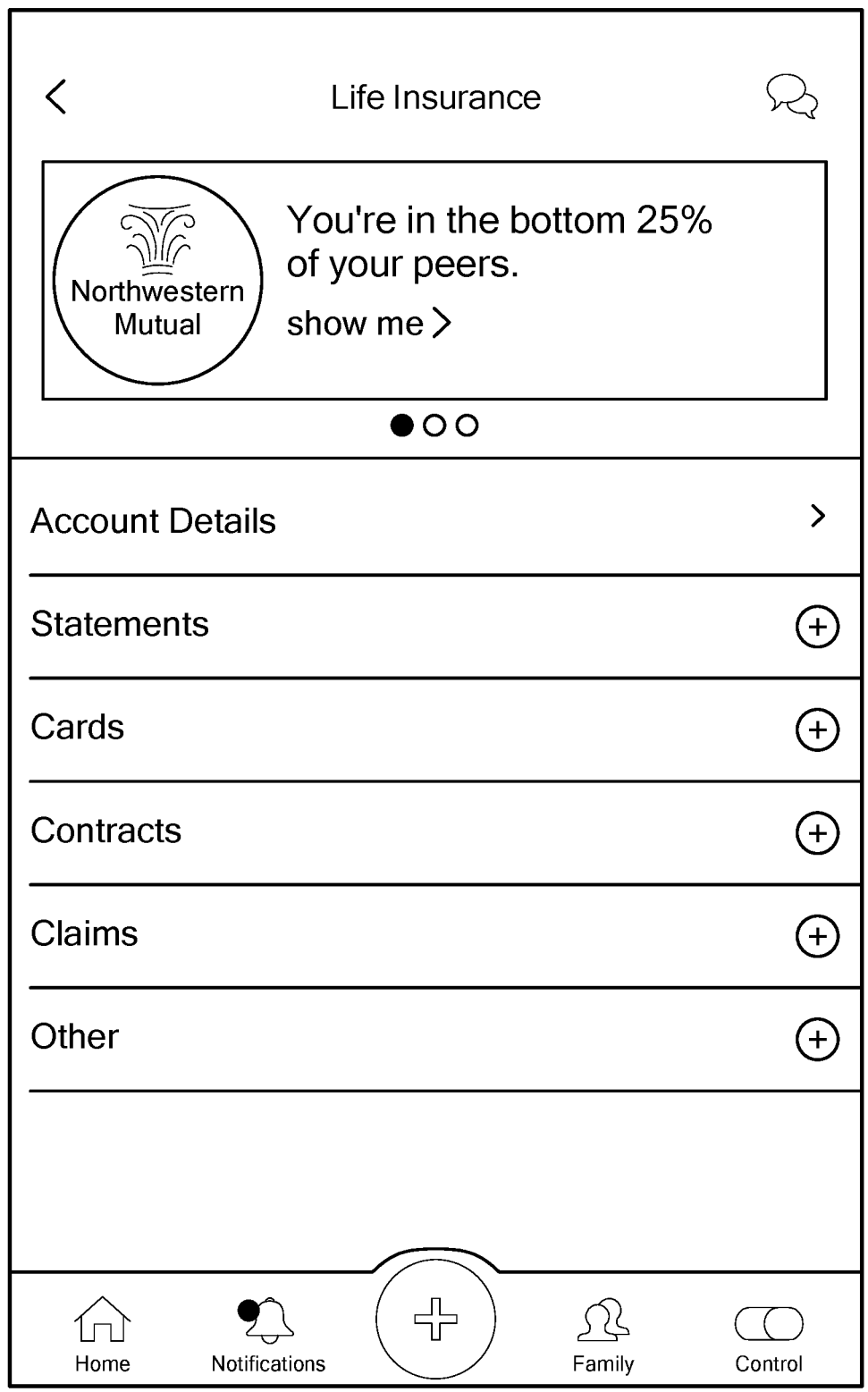

FIG. 13E shows an example of an account asset of the user where the account asset is a life insurance. In this example, the screen shows all the information related to "Life Insurance", the account asset, which consist of members selected from the group consisting of contextual categories and information types pertinent to the specific account asset. It includes information added by the specific user of the internal account, information added by other users for the specific user of the internal account, and information shared by family members of the specific user of the internal account, all related to the specific account asset contextual category. For instance, and further clarification, the "Account Details" may have been added by "Mary", a family member of Tom's family, into her own internal account, and shared with Tom.

Figure 14:
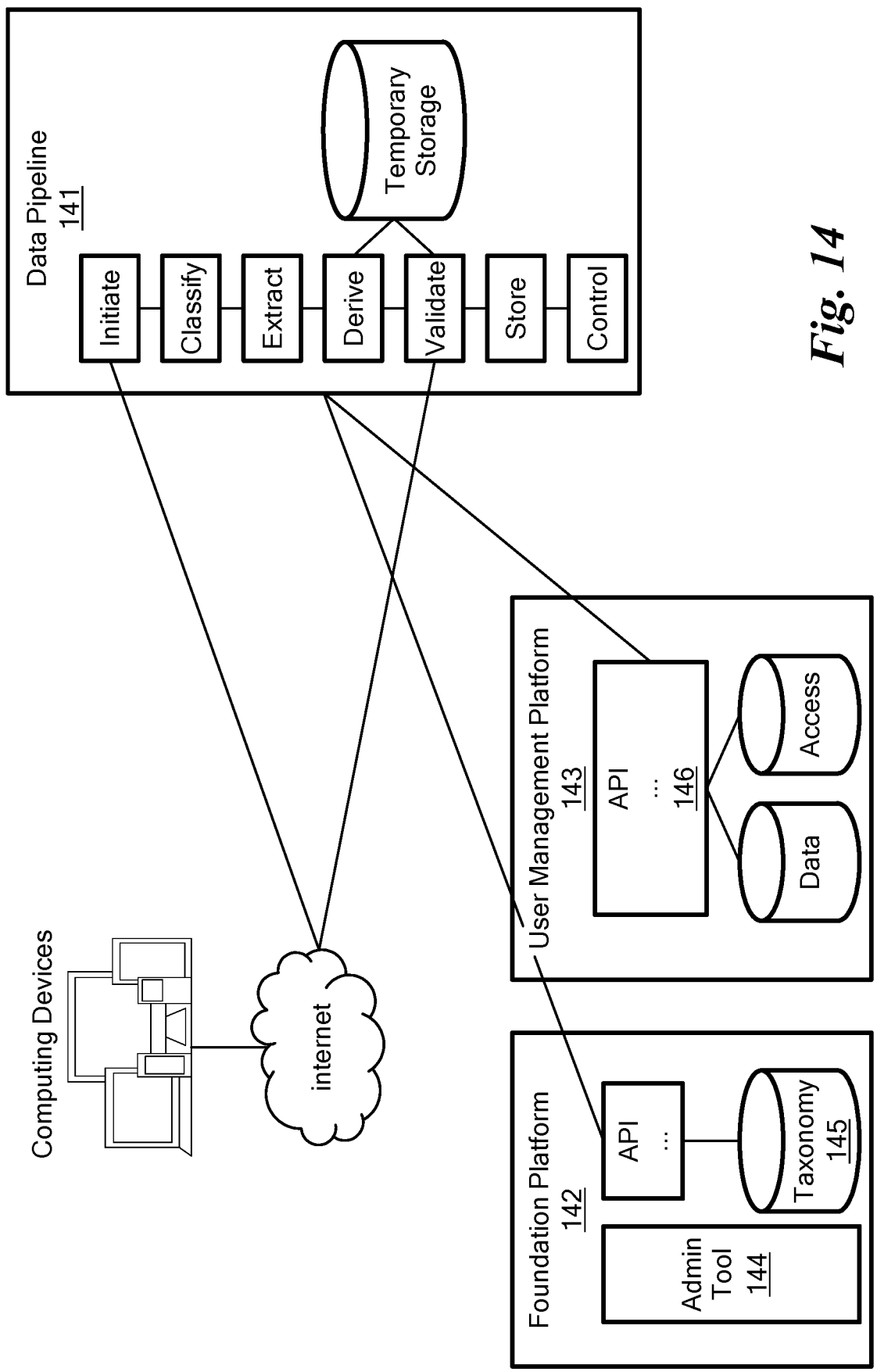
FIG. 14 is a diagram of high level system architecture of an embodiment of the present invention.

FIG. 14 is a diagram of high level system architecture of an embodiment of the present invention. The diagram shows a high-level representation of three components of the server system, the data pipeline 141, the foundation platform 142 and the user management platform 143. The foundation platform includes an administrative tool 144 for users of the company to define and manage the taxonomy database 145, which includes the definition of information types, the hierarchical definition of the contextual categories, the definition of account assets and other concepts utilized by the different components of the server system, including the artificial intelligence engines in processes 12 and 13 of FIG. 1. The user management platform includes server components exposed in an API 146 to encrypt and store information into the internal account of the user and to control and store permissions assigned to information of the specific user. The data pipeline is the set of processes to automatically organize, store, and share personal information of a specific user, which includes the processes 11 to 16 of FIG. 1.

In embodiments of the present invention, a computer-implemented infrastructure provides a consistent graphical user interface which supports user-controlled management and sharing of heterogeneous personal information of the user. The user interface enables management and sharing of any type of personal information obtained by the infrastructure in a consistent manner. FIGS. 15-22 are representations of screens of the user interface that provide such consistent management and sharing across the user's heterogeneous personal information.

Figure 15:
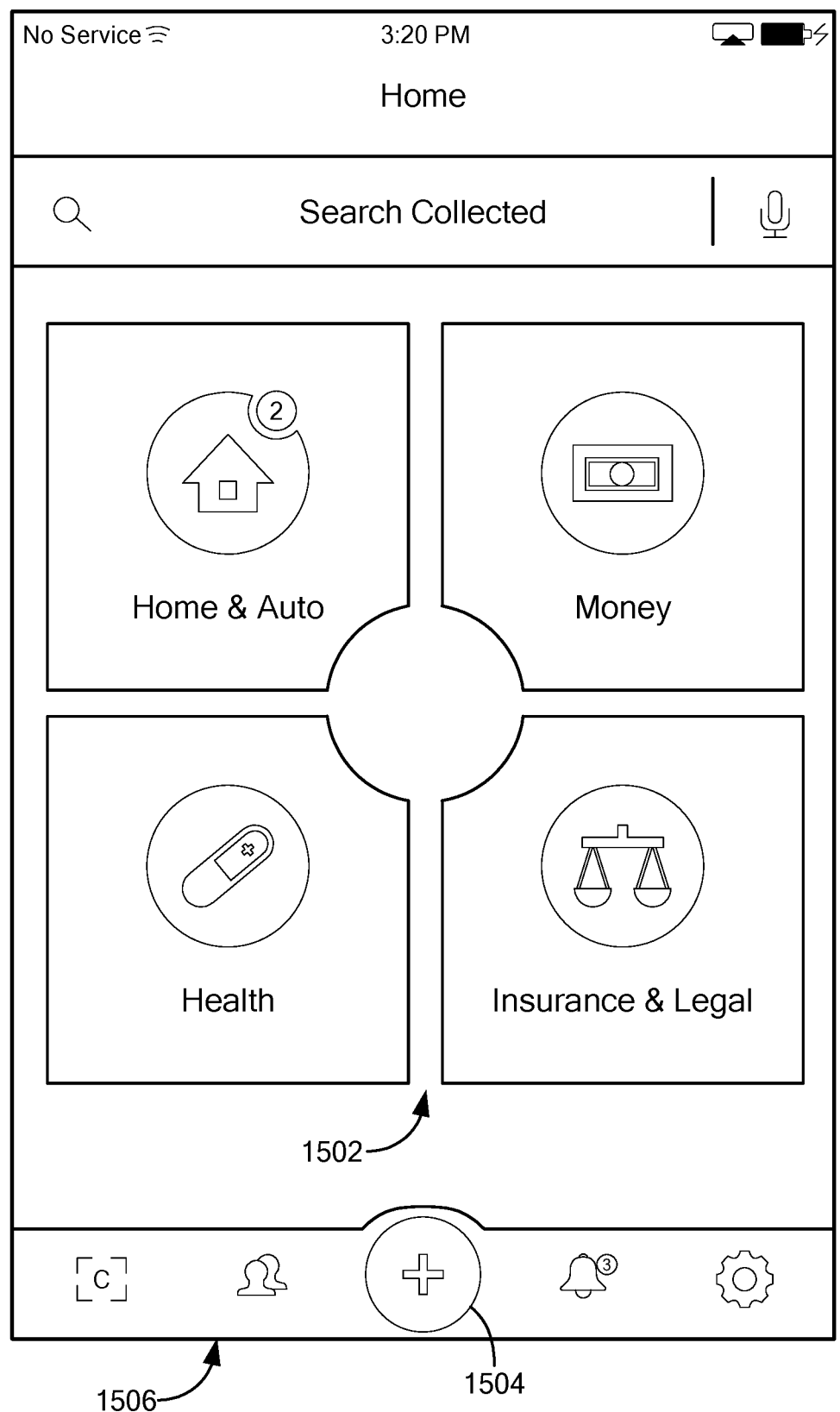
FIG. 15 shows the home screen of an aspect of the user interface displaying categories of personal information that can be managed and shared consistently via the user interface, in accordance with an embodiment of the present invention.

FIG. 15 shows the home screen of an aspect of the user interface displaying categories of personal information that can be managed and shared consistently via the user interface, in accordance with an embodiment of the present invention. In the embodiment of FIG. 15, the displayed categories 1502 include "Home & Auto," "Money," "Health," and "Insurance & Legal." Each of the displayed categories 1502 is highlighted to indicate that personal information of the user is available for that category. Using this screen, a user can add 1504 a category, with respect to any personal information, to the user's account. The user can also select one of the highlighted categories 1502, each associated with different personal information of the user, to access that personal information. The home screen also provides other options 1506 with respect to the user's system account.

Figure 16:
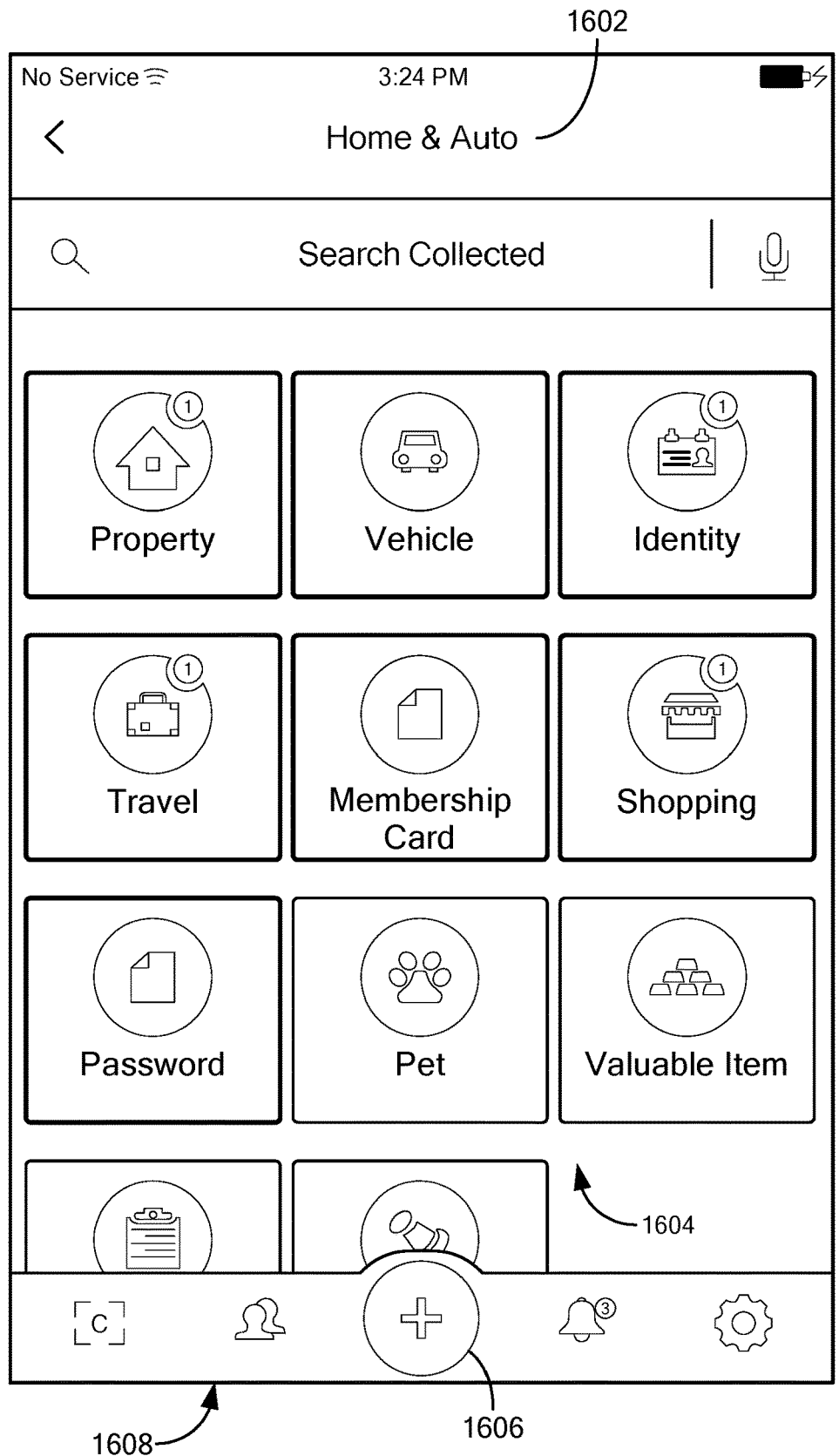
FIG. 16 shows a main category screen of an aspect of the user interface displaying sub-categories of personal information that can be managed and shared consistently via the user interface, in accordance with an embodiment of the present invention.

FIG. 16 shows a main category screen of an aspect of the user interface displaying sub-categories of personal information that can be managed and shared consistently via the user interface, in accordance with an embodiment of the present invention. In the embodiment of FIG. 16, the displayed sub-categories 1604 are for the category "Home & Auto" 1602 and include "Property," "Identity," "Membership," "Pet," etc. A set of the sub-categories 1604 are highlighted to indicate that personal information is available in each of those sub-categories. In the embodiment of FIG. 13, the highlighted sub-categories are "Property," "Vehicle," "Identity," "Travel," "Membership Card," "Shopping," and "Password." Using this screen, a user can add 1606 a sub-category, with respect to any personal information, to the user's account. The user can also select a sub-category 1604, each associated with different personal information of the user, to access that personal information. The main category screen also provides other options 1608 with respect to the user's system account.

Figure 17A:
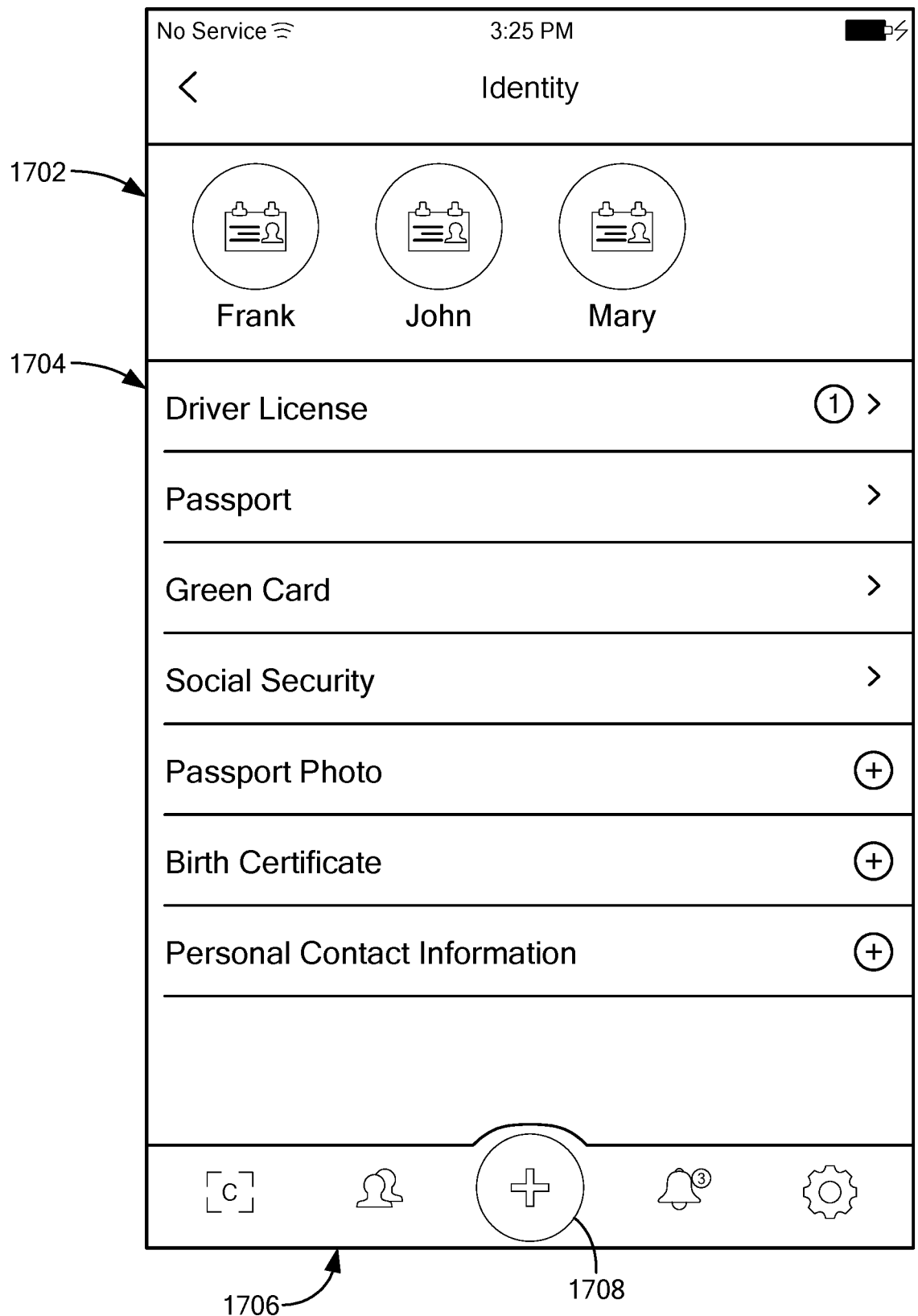
FIGS. 17A-C show contextual category screens of an aspect of the user interface displaying consistently contextual categories of personal information that can be managed and shared via the user interface, in accordance with an embodiment of the present invention.
Figure 17B:
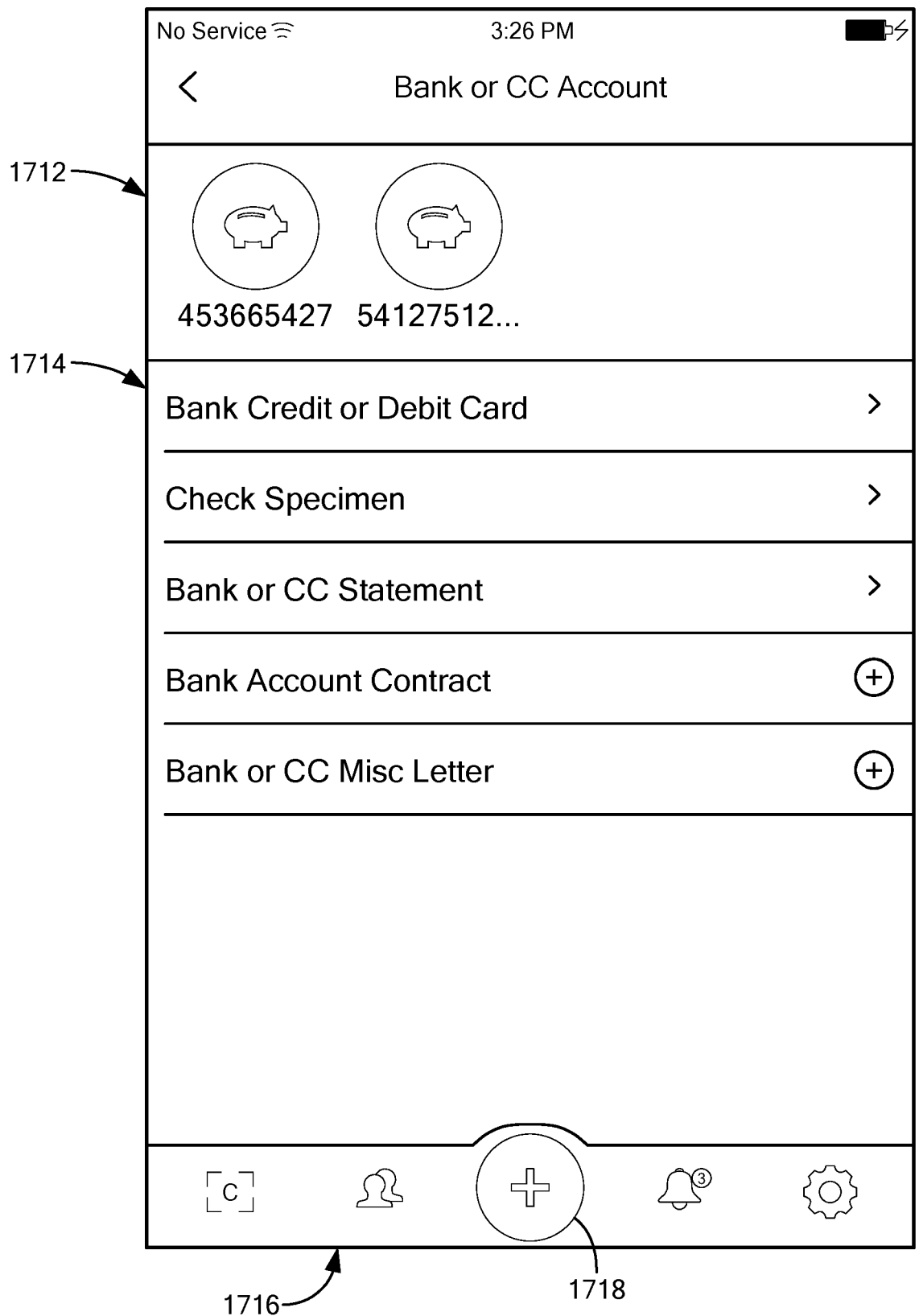
Figure 17C:
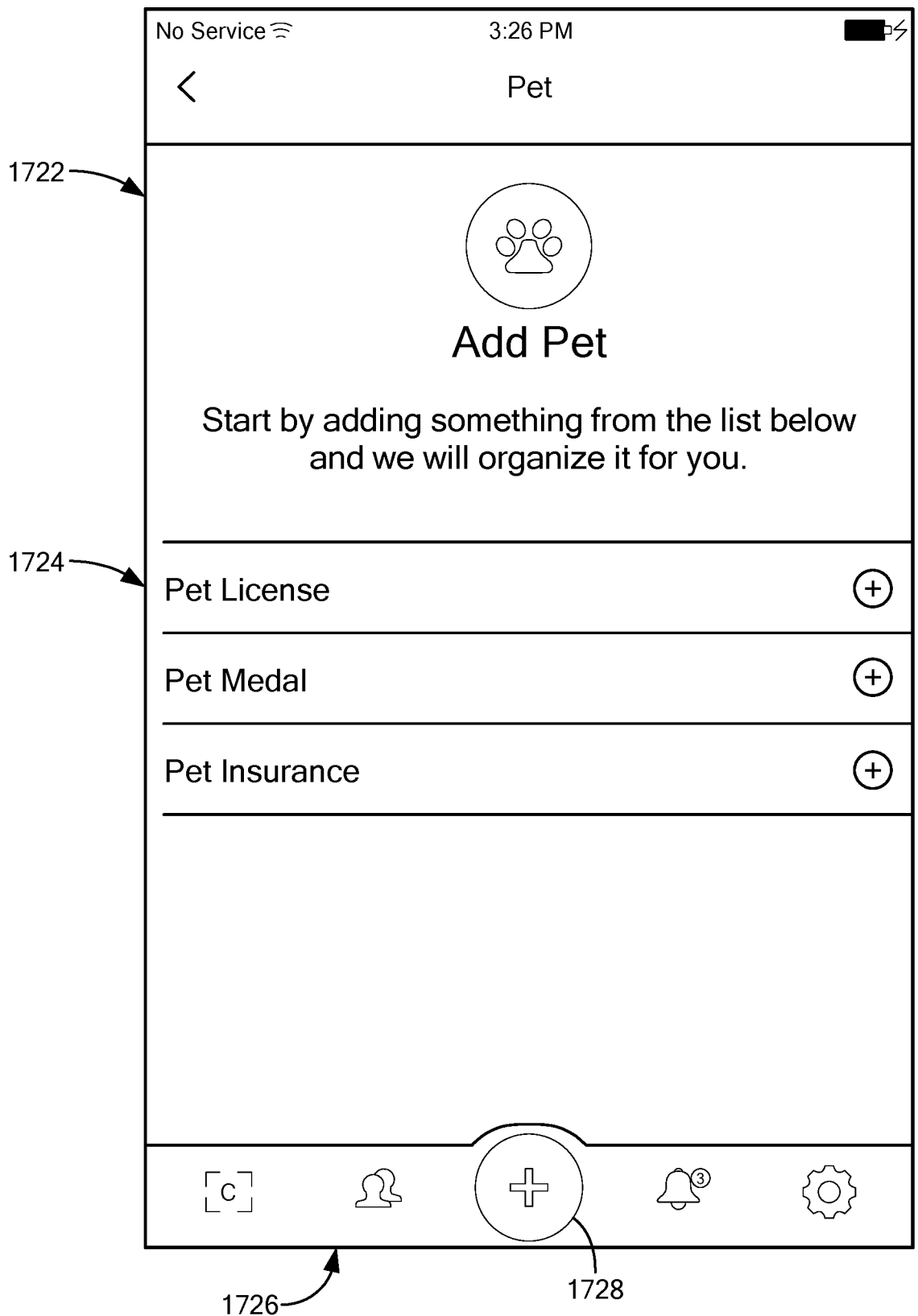

FIGS. 17A-C show contextual category screens of an aspect of the user interface displaying consistently contextual categories of personal information that can be managed and shared via the user interface, in accordance with an embodiment of the present invention. FIG. 17A shows the "Identity" contextual category screen, which includes a list 1704 of contextual categories of personal information related to users' identity, such as "Driver License," "Passport," etc. This contextual category screen also includes graphical representations 1702 of users for which identify information may be accessed, an option 1708 to add another contextual category related to users' identity, and other options 1706 related to the user's system account.

FIG. 17B shows the contextual category screen for "Bank or CC Account" personal information, which is displayed in a manner consistent with the "Identity" contextual category screen of FIG. 17A. The "Bank or CC Account" contextual category screen of FIG. 17B includes a list 1714 of contextual categories of personal information related to a user's accounts, such as "Bank Credit or Debit Card," "Check Specimen," etc. This contextual category screen also includes graphical representations 1712 of accounts for which personal information may be accessed, an option 1718 to add another contextual category related to the user's account, and other options 1716 related to the user's system account.

FIG. 17C shows the contextual category screen for "Pet" personal information, which is displayed in a manner consistent with the "Identity" contextual category screen of FIG. 17A and the "Bank or CC Account" contextual category screen of FIG. 17B. The "Pet" contextual category screen of FIG. 17C includes a list 1724 of contextual categories of personal information related to a user's pets, such as "Pet License," "Pet Medal," etc. This contextual category screen also includes graphical representations 1722 of pets for which personal information may be accessed (which is currently blank), an option 1728 to add another contextual category related to the user's pets, and other options 1726 related to the user's system account.

Figure 18A:
FIGS. 18A-D show information list screens of an aspect of the user interface displaying consistently lists of specific types of personal information, in accordance with embodiments of the present invention.

FIGS. 18A-D show information list screens of an aspect of the user interface displaying consistently lists of specific types of personal information for the user, in accordance with embodiments of the present invention. FIG. 18A shows the information list screen for a user's membership cards. The "Membership Card" information list screen of FIG. 18A includes a list 1802 of the user's membership cards, such as "SHANGRILA SPA's Membership Card," etc. This information list screen also includes an option 1808 to add other membership cards and other options 1804 related to the user's system account.

Figure 18B:
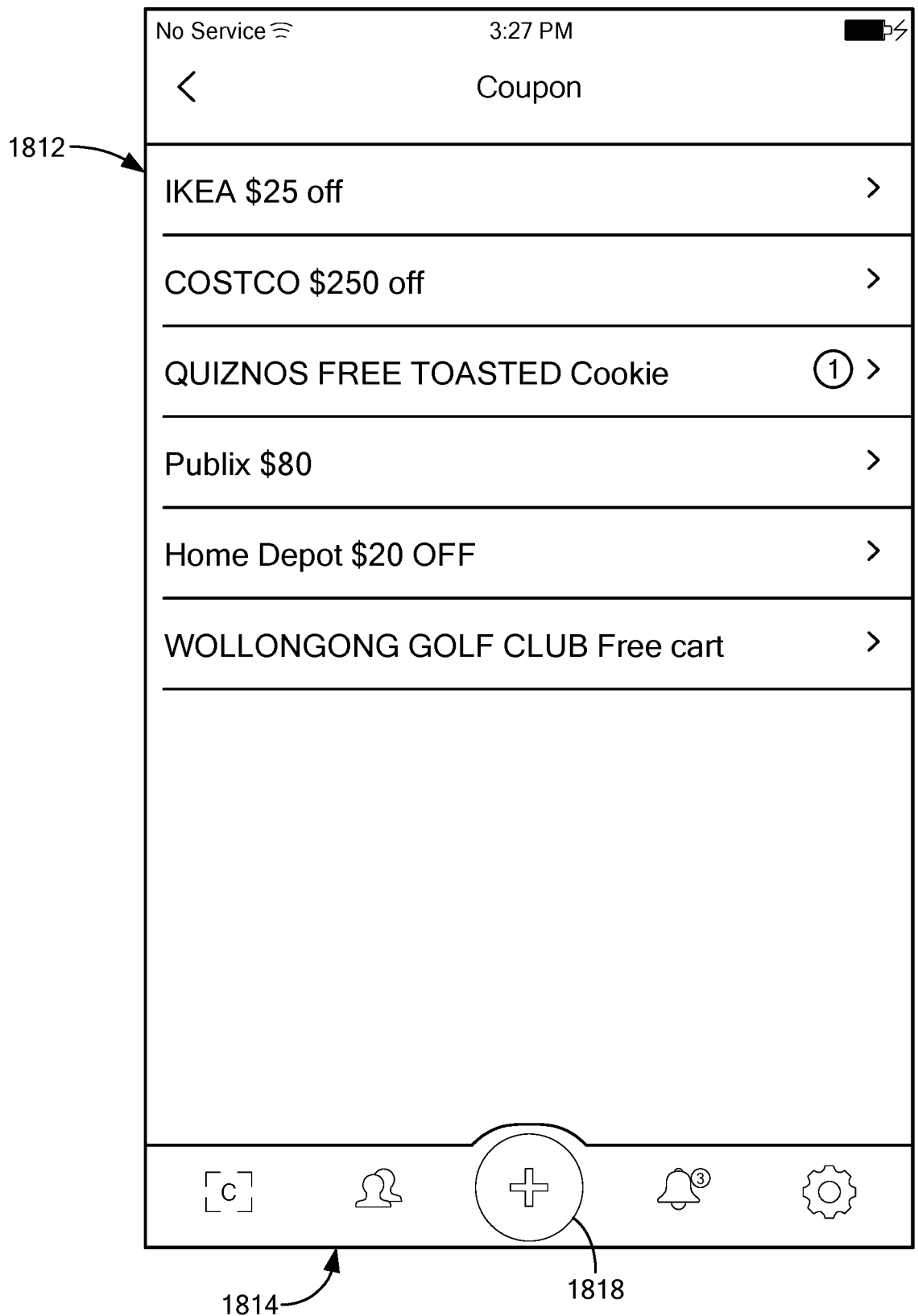

FIG. 18B shows the information list screen for a user's coupons, which is displayed in a manner consistent with the "Membership Card" information list screen of FIG. 18A. The "Coupon" information list screen of FIG. 18B includes a list 1812 of a user's coupons, such as "IKEA $35 off," etc. This information list screen also includes an option 1818 to add other coupons and other options 1814 related to the user's system account.

Figure 18C:
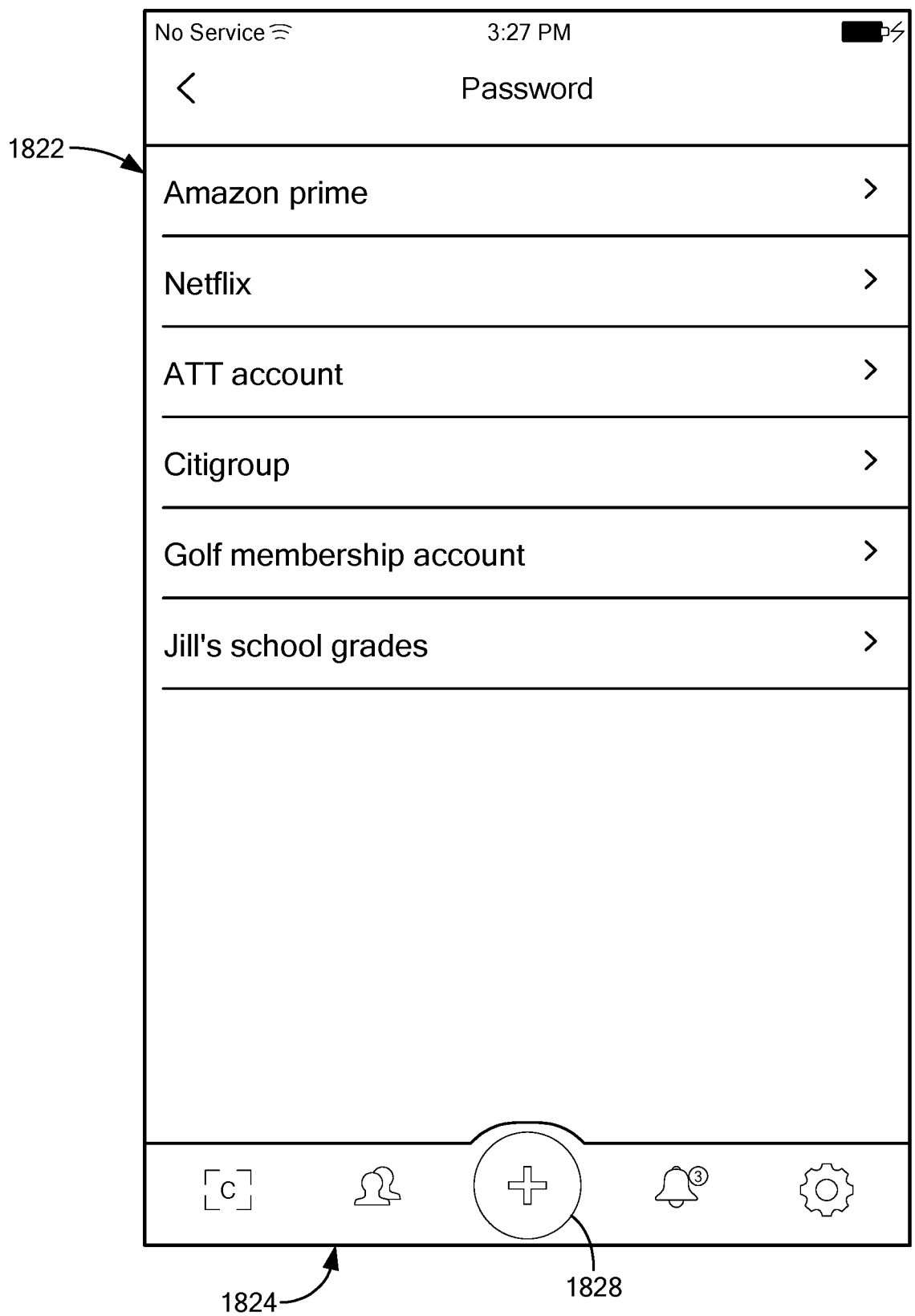

FIG. 18C shows the information list screen for a user's password-protected accounts, which is displayed in a manner consistent with the "Membership Card" information list screen of FIG. 18A and the "Coupon" information list screen of FIG. 18B. The "Password" list screen of FIG. 18C includes a list 1822 of the user's password-protected accounts, such as "Netflix," etc. This information list screen also includes an option 1828 to add other password-protected accounts and other options 1824 related to the user's system account.

Figure 18D:
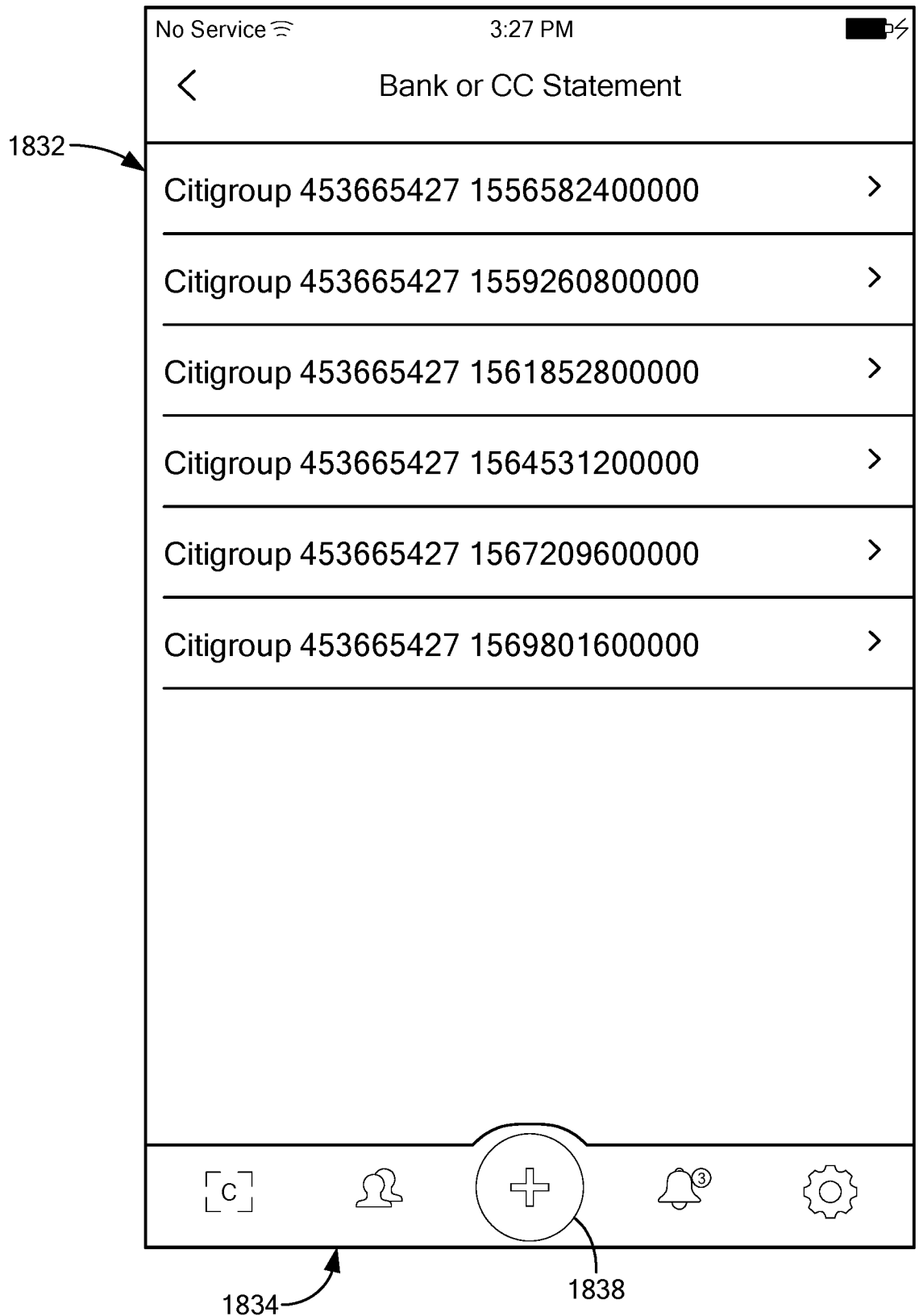

FIG. 18D shows the information list screen for a user's bank and credit card accounts, which is displayed in a manner consistent with the "Membership Card" information list screen of FIG. 18A, the "Coupon" information list screen of FIG. 18B, and the "Password" information list screen of FIG. 18C. The "Bank or CC Statement" information list screen of FIG. 18D includes a list 1832 of the user's bank or credit card accounts, such as "Citigroup 453665427 1556582400000," etc. This information list screen also includes an option 1838 to add other bank or credit card accounts and other options 1834 related to the user's system account.

Figure 19A:
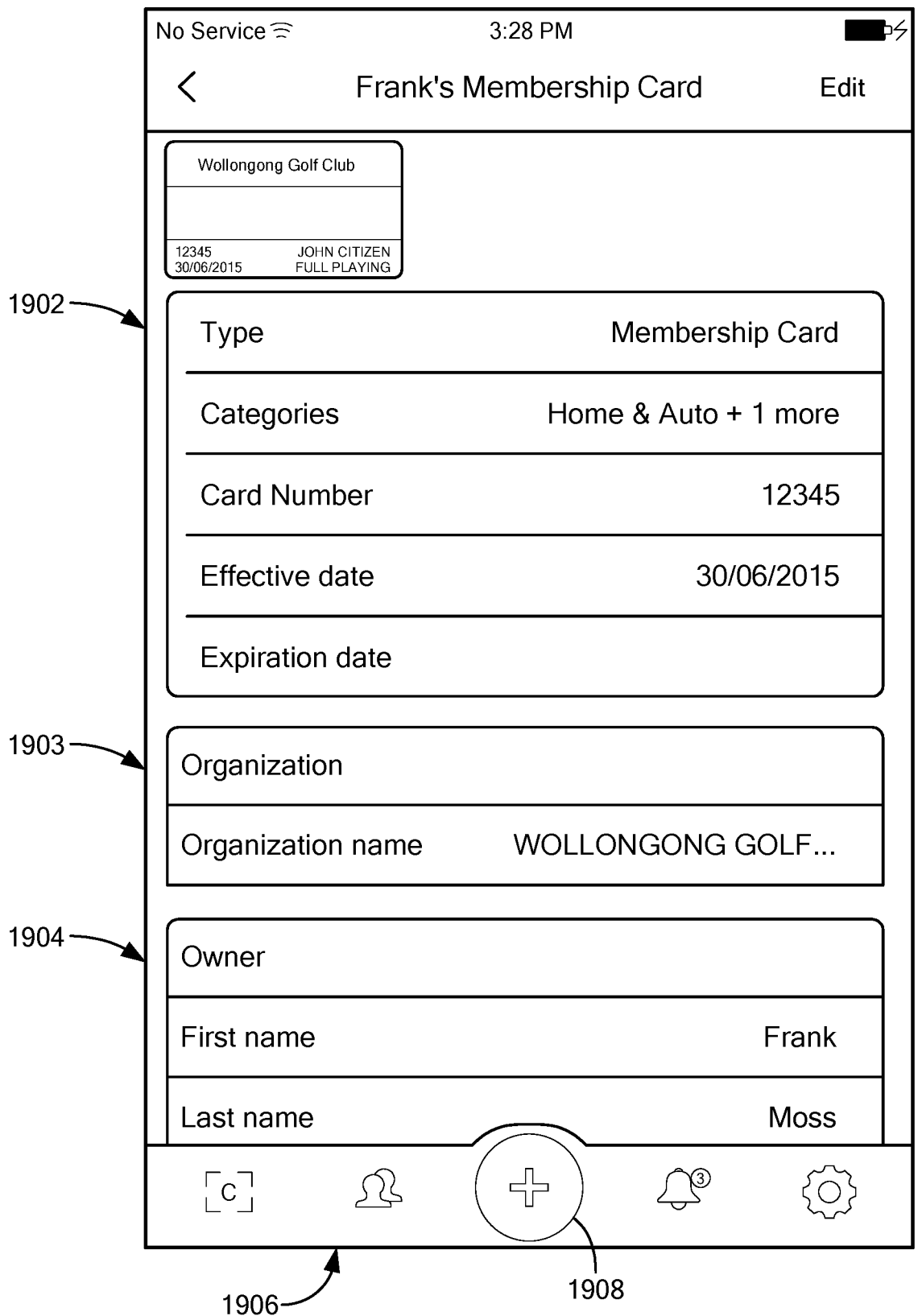
FIGS. 19A-C show information screens of an aspect of the user interface displaying consistently parameters of personal information that can be managed and shared via the user interface, in accordance with an embodiment of the present invention.
Figure 19B:
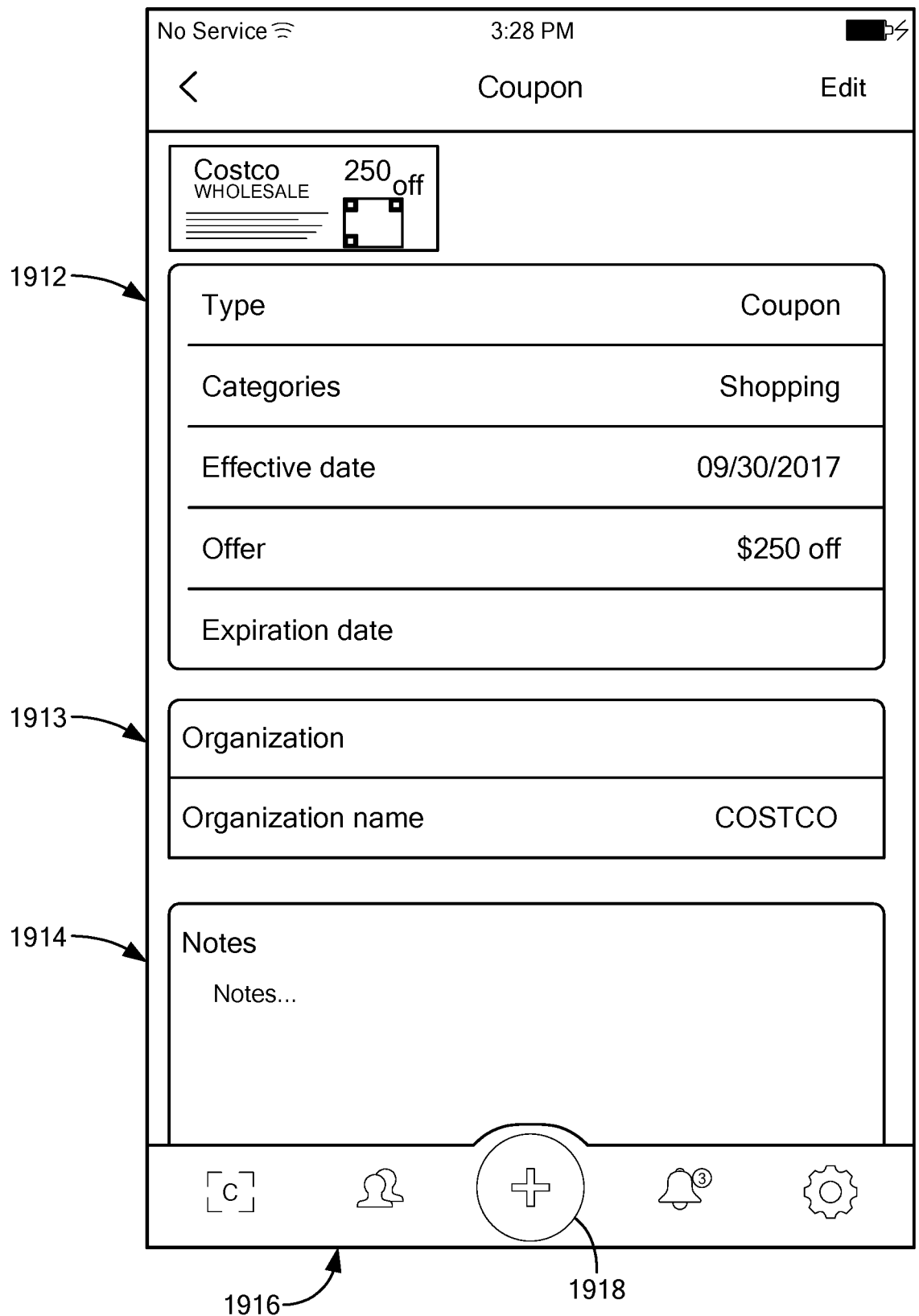
Figure 19C:
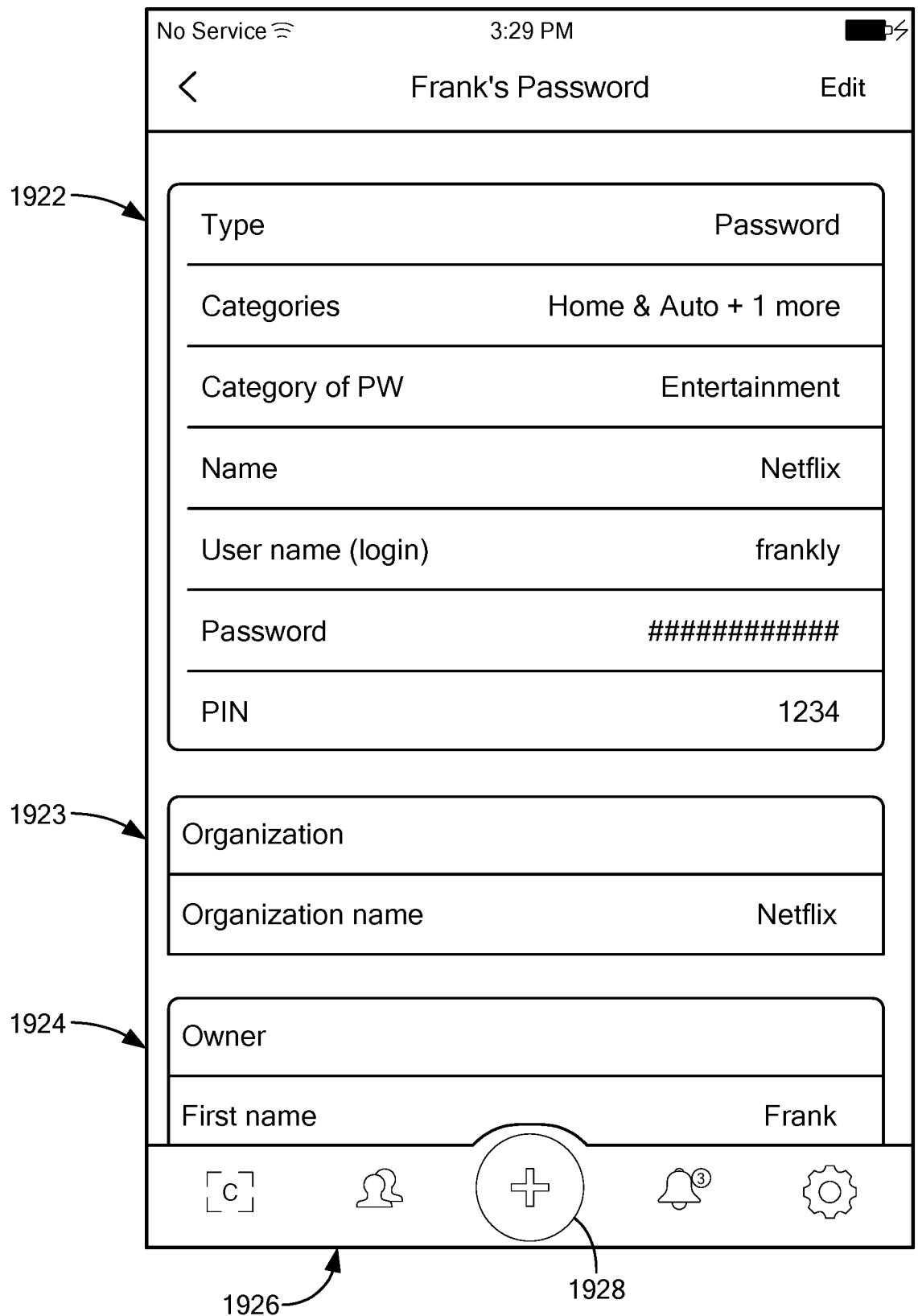

FIGS. 19A-C show information screens of an aspect of the user interface displaying consistently parameters of personal information that can be managed and shared via the user interface, in accordance with an embodiment of the present invention. FIG. 19A shows the information screen for a specific membership card of the user. The "Membership Card" information screen of FIG. 19A includes a list 1902 of parameters associated with the specific membership card of the user Frank, such as "Card Number," "Effective Date," "Expiration Date," etc. This information screen also includes the organization 1903 associated with the specific membership card and other information 1904 (e.g., Owner information) associated with the card. This information screen further includes an option 1908 to add other membership card parameters and other options 1906 related to the user's system account.

FIG. 19B shows the information screen for a specific coupon of the user, which is displayed in a manner consistent with the "Membership Card" information screen of FIG. 18A. The "Coupon" information screen of FIG. 19B includes a list 1912 of parameters associated with the specific coupon of the user, such as "Offer," "Effective Date," "Expiration Date," etc. This information screen also includes the organization 1913 associated with the specific coupon and other information 1914 (e.g., Notes) associated with the coupon. This information screen further includes an option 1918 to add other coupon parameters and other options 1916 related to the user's system account.

FIG. 19C shows the information screen for a specific password-protected account of the user, which is displayed in a manner consistent with the "Membership Card" information screen of FIG. 18A and the "Coupon" information screen of FIG. 19B. The "Password" information screen of FIG. 19C includes a list 1922 of parameters associated with the specific password-protected account of the user Frank, such as "User Name," "Password," "PIN," etc. This information screen also includes the organization 1923 associated with the specific password-protected account and other information 1924 (e.g., Owner) associated with the account. This information screen further includes an option 1928 to add other password related parameters and other options 1926 related to the user's system account.

Figure 20A:
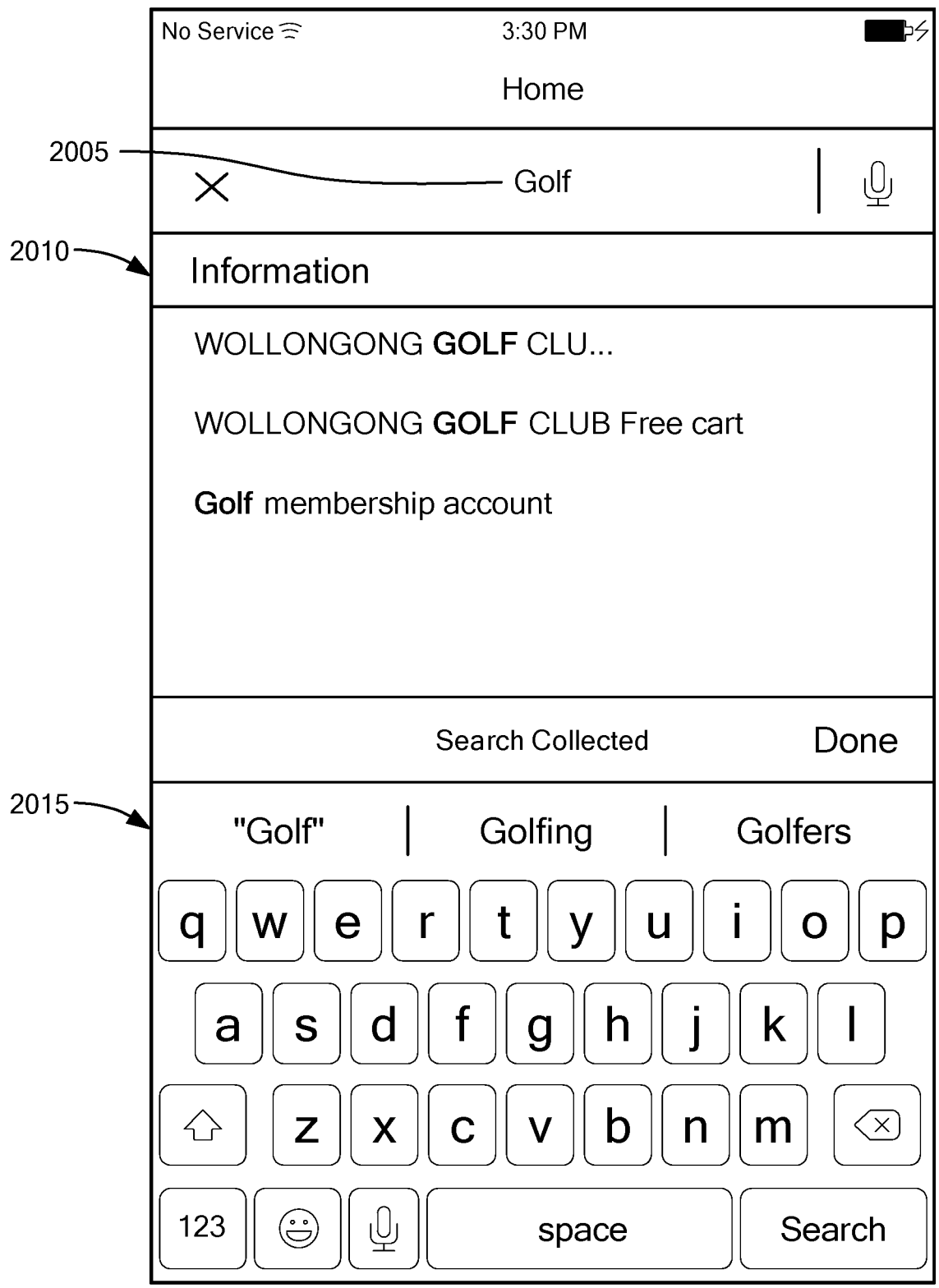
FIGS. 20A and 20B show search screens of an aspect of the user interface displaying consistently search results across heterogeneous types of personal information for the user, in accordance with an embodiment of the present invention.
Figure 20B:
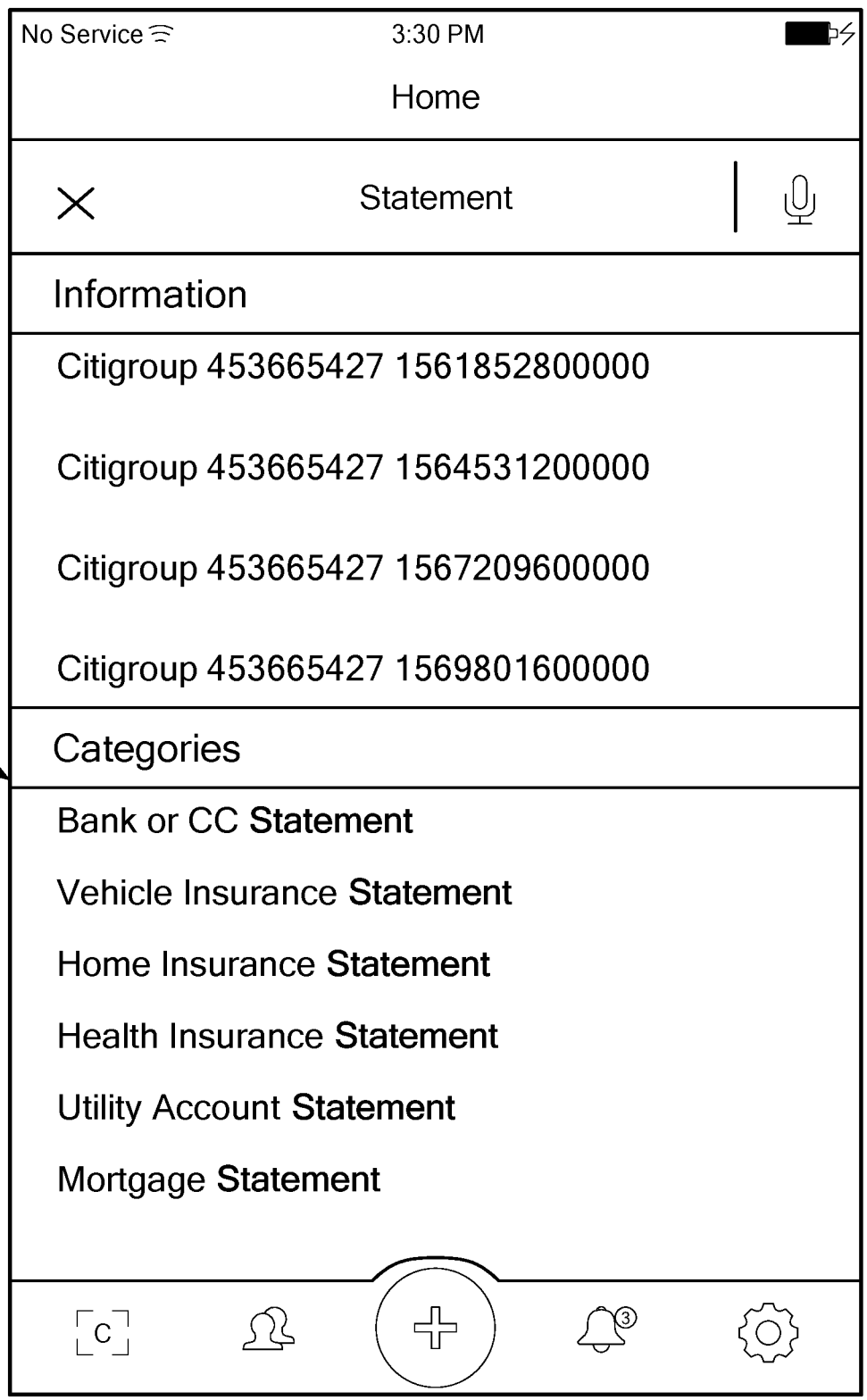

FIGS. 20A and 20B show search screens of an aspect of the user interface displaying consistently search results across heterogeneous types of personal information for the user, in accordance with an embodiment of the present invention. In FIG. 20A, the user entered the search term "Golf" 2005 at the search window of the displayed search screen via the virtual keyboard 2015. In response, the search screen caused a search to be performed across the heterogeneous personal information associated with the user. The search found results that included different types of personal information, such as membership card information, coupon information, and password information. The search screen displays consistently the resulting different types of personal information, such as "Golf Membership Account," via display window 2010.

FIG. 20B shows a search screen displaying the results of the search of the term "Statement." The search screen displays consistently, via category display window 2020, the search results from different categories of heterogeneous personal information, including "Vehicle Insurance Statement," "Home Insurance Statement," "Mortgage Statement," etc.

Figure 21:
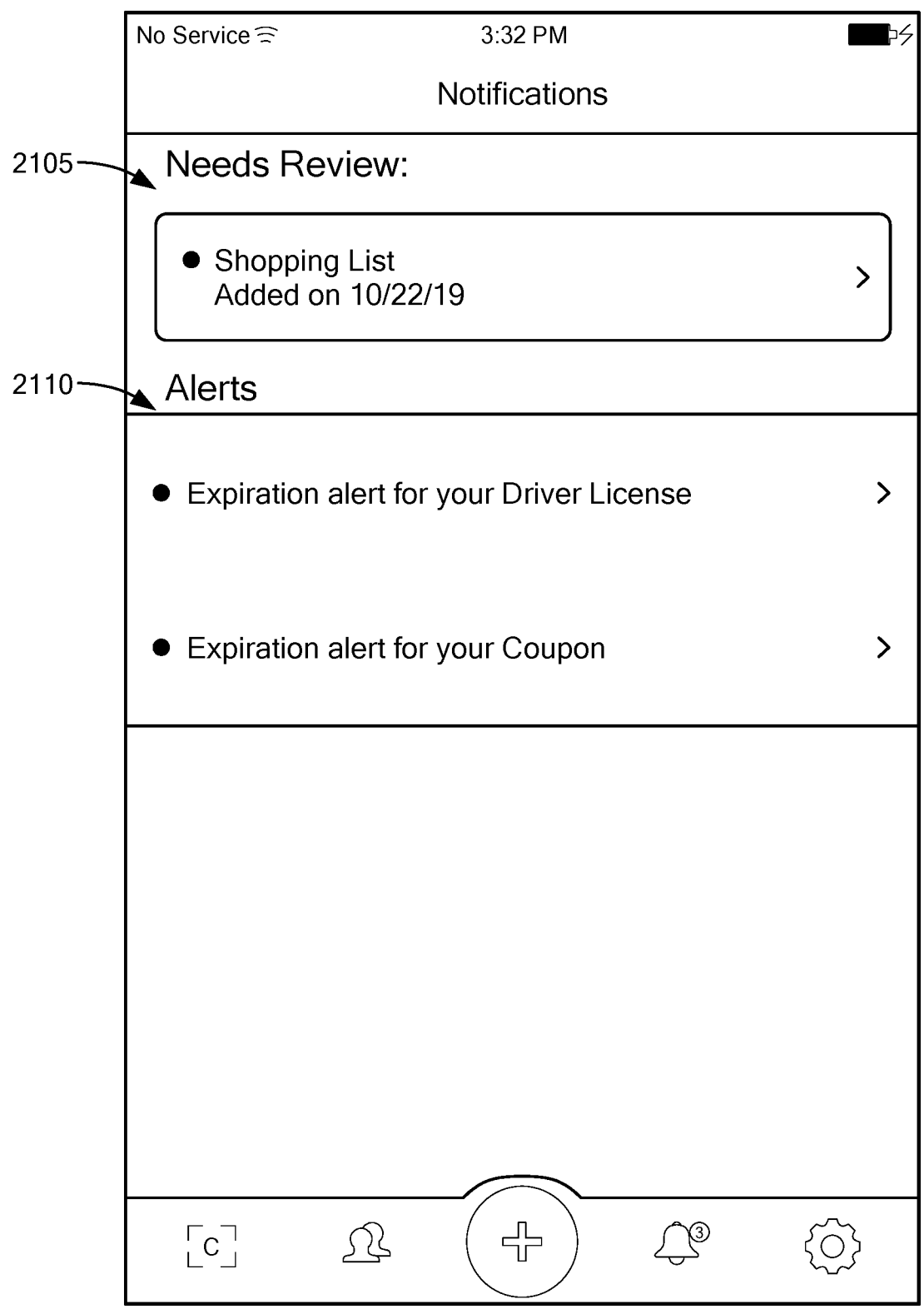
FIG. 21 shows a notification screen of an aspect of the user interface displaying consistently notifications across heterogeneous types of personal information for the user, in accordance with an embodiment of the present invention.

FIG. 21 shows a notification screen of an aspect of the user interface displaying consistently notifications across heterogeneous types of personal information for the user, in accordance with an embodiment of the present invention. The displayed notifications include both documents for review 2105 and alerts 2110. The notification screen of FIG. 21 displays consistently notifications related to the heterogeneous personal information of a shopping list, a driver's license, and a coupon of the user.

Figure 22:
FIG. 22 shows a sharing screen of an aspect of the user interface displaying consistently heterogeneous types of personal information shared with the user's network, in accordance with an embodiment of the present invention.

FIG. 22 shows a sharing screen of an aspect of the user interface displaying consistently heterogeneous types of personal information shared with the user's network, in accordance with an embodiment of the present invention. The sharing screen of FIG. 22 shows both collections 2205 of documents and individual documents 2210 that are being shared by the user. The sharing screen displays consistently the shared heterogeneous personal information of taxes, mortgage refinance, driver's license, diesel watch, etc.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented infrastructure providing a consistent graphical user interface supporting user-controlled organizing, storing, accessing and sharing of heterogeneous personal information of a specific user, the infrastructure using computer processes executed by a server system, the computer processes comprising:

receiving a set of items of information from a computing device operated on behalf of the specific user, wherein receiving the set of items of information includes receiving information selected from the group consisting of (i) a digital file defining a set of images, (ii) a digital file defining a document, (iii) external account information of the specific user, (iv) textual information provided by manual input, (v) a digital file defining a video recording, (vi) a digital file defining an audio recording, (vii) digital data associated with communication across an API, and combinations thereof;

for each item of information in the received set of items, obtaining, as a result of parsing the received set of items, new information including an information type and a set of data fields pertinent to the information type;

using the new information, and other user information stored in association with an internal account of the specific user, to produce derived information selected from the group consisting of contact information, event information, inferred information, and relationships between the new information and the other user information and combinations of any of the foregoing;

wherein:

(a) the derived information further includes a set of contextual categories pertinent to components of the new information and the derived information, a contextual category being assigned to a component based on specific attributes of the component, the contextual categories being assigned in accordance with a taxonomy that provides a unifying context for similar components of information, the taxonomy being hierarchically arranged in a manner wherein a child contextual category can have a plurality of parent contextual categories; and (b) information type definitions are stored in a taxonomy database;

storing, with respect to each item of information, the new information and the derived information, in a storage system in communication with the server system, and associating such stored item of information with an internal account of the specific user and with the corresponding information type and set of data fields and causing the stored items of information to be made accessible through the graphical user interface.

2. An infrastructure according to claim 1, wherein the computer processes further comprise parsing by the server system the received set of items to derive the information type and the set of data fields.

3. An infrastructure according to claim 1, wherein the information type and the set of data fields are determined by parsing by the computing device, and the computer processes further comprise receiving, by the server system, data characterizing the information type and the set of data fields.

4. An infrastructure according to claim 1, wherein the derived information further includes a set of contextual categories pertinent to components of the new information and the derived information, wherein a contextual category is assigned to a component based on specific attributes of the component, and distinct components are permitted to be assigned distinct contextual categories that depend on attributes of the components, and each component has a set of contextual categories, and storing the new information and the derived information further includes storing each component of information with its corresponding set of contextual categories.

5. An infrastructure according to claim 1, wherein the computer processes further comprise:

before storing new information and derived information that are pertinent to a specific item of information, causing sharing of the new information and the derived information in accordance with a default user sharing selection.

6. An infrastructure according to claim 1, wherein the computer processes further comprise:

before storing new information and derived information that are pertinent to a specific item of information, generating a prompt to the specific user to make a selection concerning sharing preferences applicable thereto, storing a response of the specific user thereto, and causing sharing of such information accordingly.

7. An infrastructure according to claim 5, wherein the default user sharing selection for any given component of information is based on a subset of contextual categories to which the given component has been assigned.

8. An infrastructure according claim 7, wherein the subset of contextual categories is selected from a global set of contextual categories and the categories in the global set are hierarchically arranged.

9. An infrastructure according to claim 8, further comprising, upon receiving a selection from the specific user relating to a specific account asset of the user, causing display, on a computing device of the specific user, of a set of representations of members selected from the group consisting of contextual categories and information types pertinent to the specific account asset of the user, wherein the display includes pertinent information currently associated with the specific account regardless whether added by the specific user or by any other person or originating elsewhere and shared with the specific user.

10. An infrastructure according to claim 8, further comprising, upon receiving a selection from the specific user relating to a specific contextual category of the user, causing display, on a computing device of the specific user, of a set of representations of members selected from the group consisting of contextual categories and information types pertinent to the specific account asset of the user, wherein the display includes pertinent information currently associated with the specific account regardless whether added by the specific user or by any other person or originating elsewhere and shared with the specific user.

* * * * *